US010577989B2

(12) United States Patent
Kim et al.

(10) Patent No.: US 10,577,989 B2
(45) Date of Patent: Mar. 3, 2020

(54) VEHICLE OIL WARMER AND HEAT EXCHANGE SYSTEM

(71) Applicant: Hanon Systems, Daejeon (KR)

(72) Inventors: Jae Hoon Kim, Daejeon (KR);
Dong-Hee Ye, Daejeon (KR)

(73) Assignee: Hanon Systems, Daejeon (KR)

( * ) Notice: Subject to any disclaimer, the term of this patent is extended or adjusted under 35 U.S.C. 154(b) by 214 days.

(21) Appl. No.: 15/735,880

(22) PCT Filed: Aug. 18, 2016

(86) PCT No.: PCT/KR2016/009081
§ 371 (c)(1),
(2) Date: Dec. 12, 2017

(87) PCT Pub. No.: WO2017/030381
PCT Pub. Date: Feb. 23, 2017

(65) Prior Publication Data
US 2019/0284973 A1    Sep. 19, 2019

(30) Foreign Application Priority Data

Aug. 18, 2015   (KR) .................. 10-2015-0116138
Mar. 25, 2016   (KR) .................. 10-2016-0035733

(51) Int. Cl.
*F01M 5/00*       (2006.01)
*F01M 5/02*       (2006.01)
(Continued)

(52) U.S. Cl.
CPC .............. *F01M 5/001* (2013.01); *B60H 1/32* (2013.01); *F01M 5/00* (2013.01); *F01M 5/005* (2013.01);
(Continued)

(58) Field of Classification Search
CPC .......... F01M 5/001; F01M 5/00; F01M 5/005; F01M 5/02; F01M 5/021; B60H 1/32;
(Continued)

(56) References Cited

U.S. PATENT DOCUMENTS 6,612,293 B2 *   9/2003   Schweinzer ........ F28D 15/0275
                                                  123/568.12
2008/0115923 A1 *  5/2008  Yamanaka ................ F01N 5/02
                                                  165/276

FOREIGN PATENT DOCUMENTS

CN    102543365 A   *   7/2012
GB      2270375 A   *   3/1994   ................ F01P 3/22
(Continued)

OTHER PUBLICATIONS

International Search Report issued in PCT/KR2016/009081 dated Nov. 9, 2016.

*Primary Examiner* — Tho V Duong
(74) *Attorney, Agent, or Firm* — Norton Rose Fulbright US LLP

(57) ABSTRACT

The present invention relates to a vehicle oil warmer and a heat exchange system. More particularly, the present invention relates to a vehicle oil warmer and a heat exchange system, which enable a heat exchange between a coolant and oil to be automatically controlled according to the temperature of the coolant discharged from an engine, without a separate bypass valve for controlling the flow rate of the coolant, to thereby secure a heating performance of the vehicle interior while simultaneously heating the oil at the time of an initial start of the engine, and when the vehicle is running, lower the temperature of the oil by using an oil cooler in which low-temperature coolant flows, so that the temperature of the oil can be adjusted appropriately.

25 Claims, 17 Drawing Sheets

(51) Int. Cl.
  *F01P 11/08* (2006.01)
  *F28D 7/00* (2006.01)
  *F28F 21/08* (2006.01)
  *F16H 57/04* (2010.01)
  *B60H 1/32* (2006.01)
  *F28D 7/08* (2006.01)
  *F28F 1/12* (2006.01)
  *F28F 9/18* (2006.01)

(52) U.S. Cl.
  CPC .............. *F01M 5/02* (2013.01); *F01M 5/021* (2013.01); *F01P 11/08* (2013.01); *F16H 57/04* (2013.01); *F28D 7/00* (2013.01); *F28F 21/08* (2013.01); *F16H 57/0415* (2013.01); *F28D 7/085* (2013.01); *F28F 1/126* (2013.01); *F28F 9/18* (2013.01)

(58) Field of Classification Search
  CPC .. F01P 11/08; F16H 57/04; F28D 7/00; F28D 1/047; F28D 2015/0225; F28D 2021/0089; F28F 21/08
  See application file for complete search history.

(56) References Cited

FOREIGN PATENT DOCUMENTS

| | | | |
|---|---|---|---|
| JP | 2010249252 | A | 11/2010 |
| JP | 2012211511 | A | 11/2012 |
| KR | 20040054193 | A | 6/2004 |
| KR | 100866020 | B1 | 10/2008 |
| KR | 20130067099 | A | 6/2013 |

\* cited by examiner

[FIG. 1]
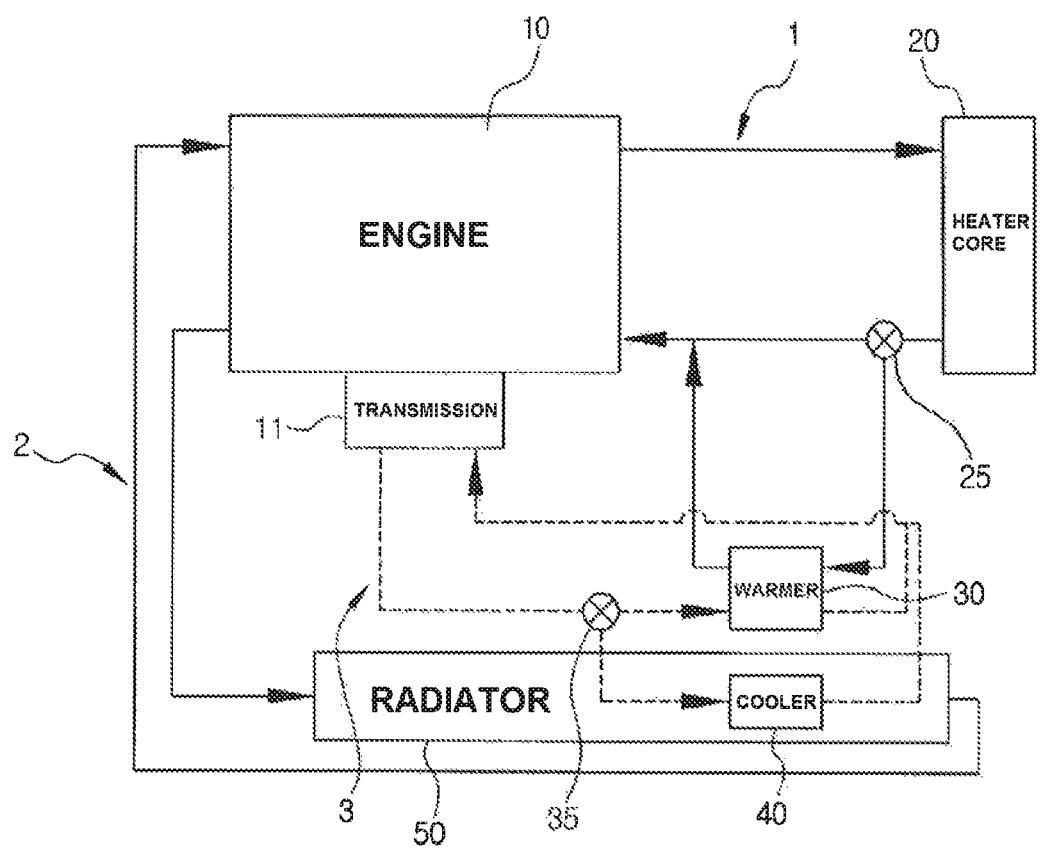

[FIG. 2]
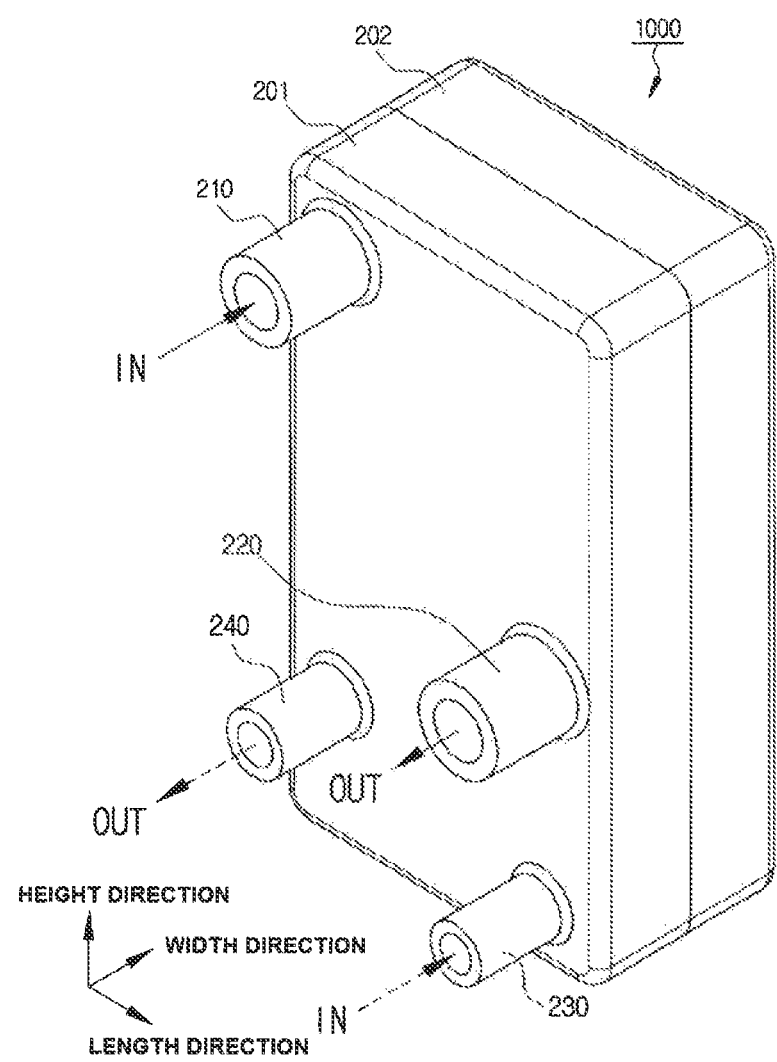

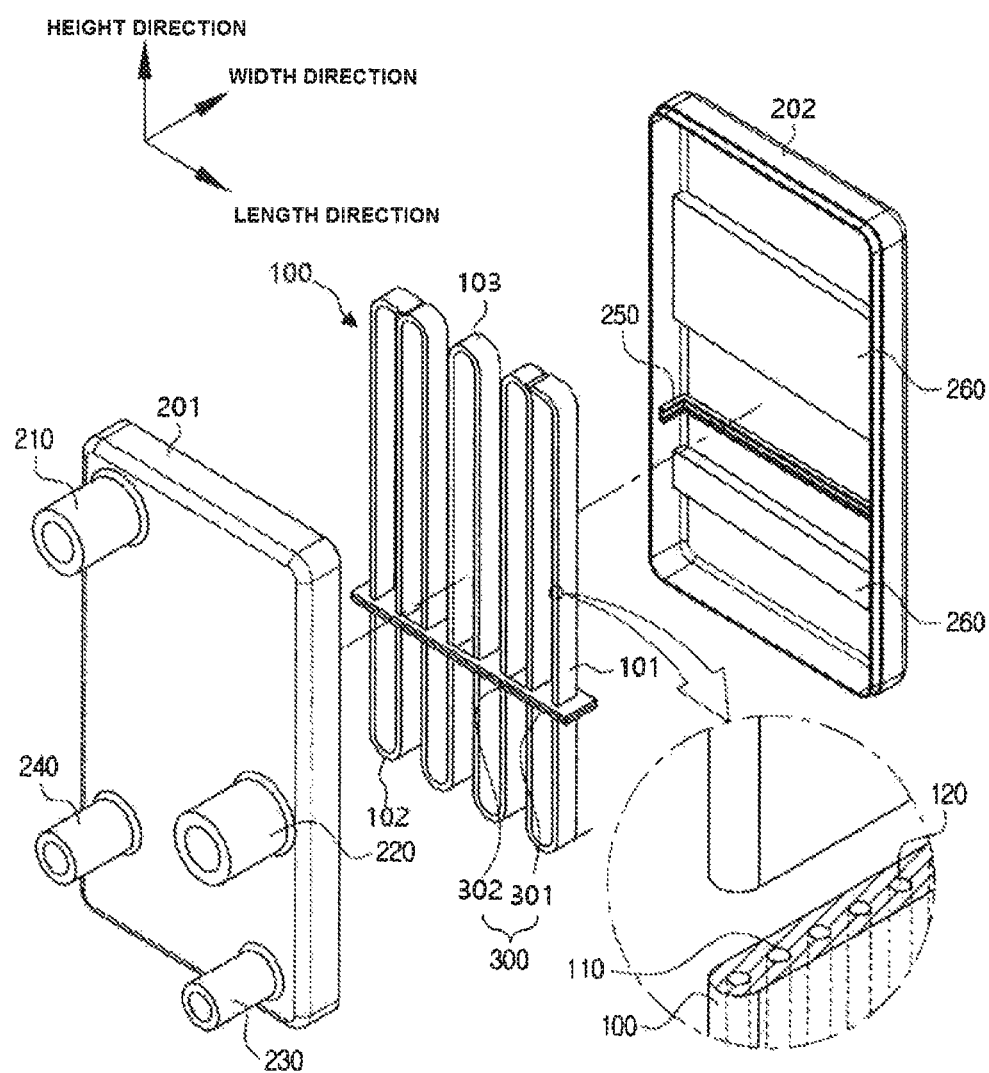
[FIG. 3]

[FIG. 4]
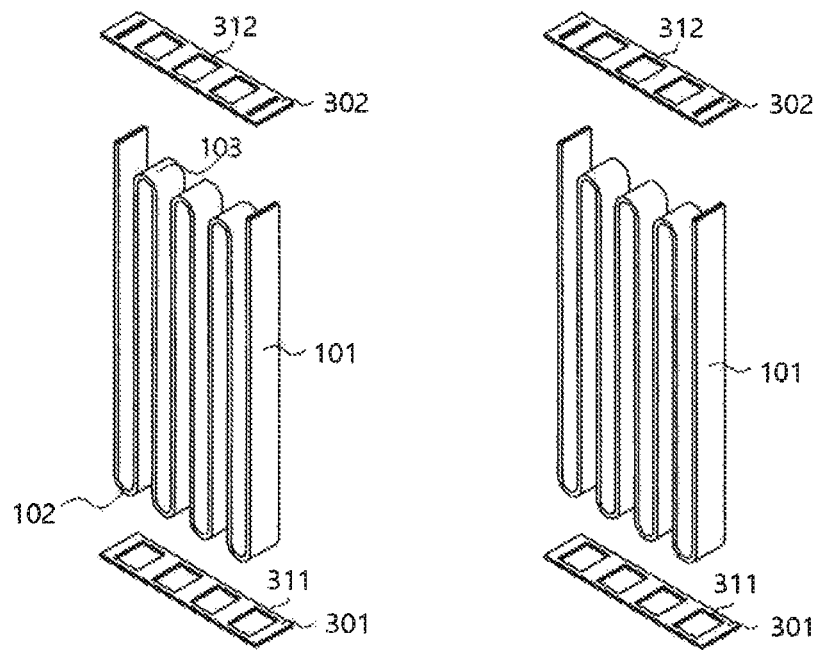
(a) (b)
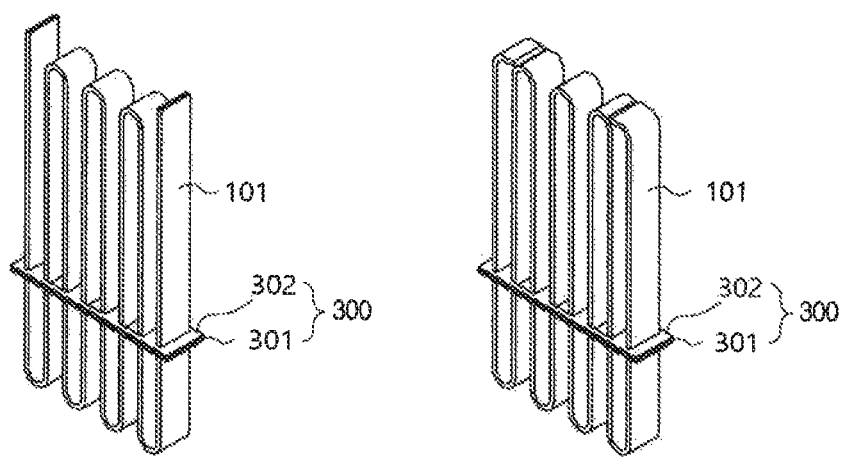
(c) (d)

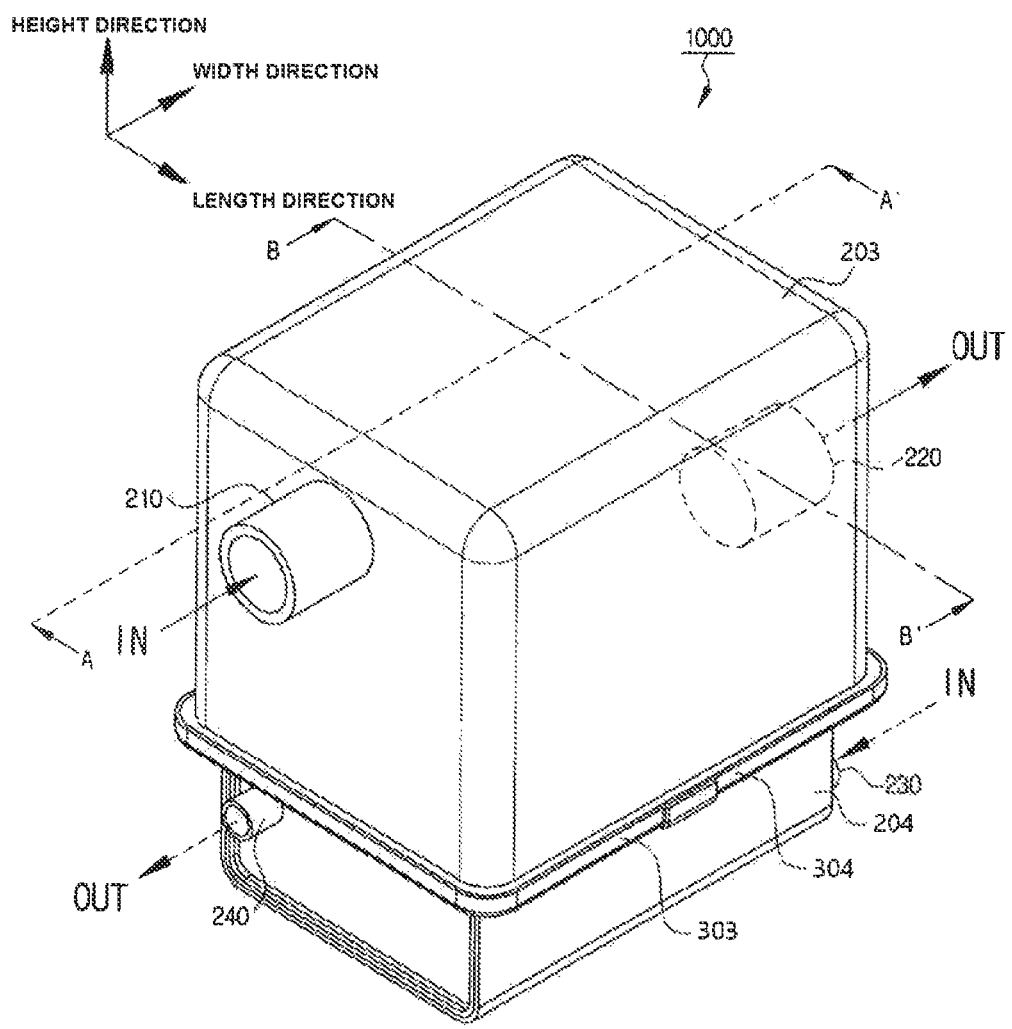
[FIG. 5]

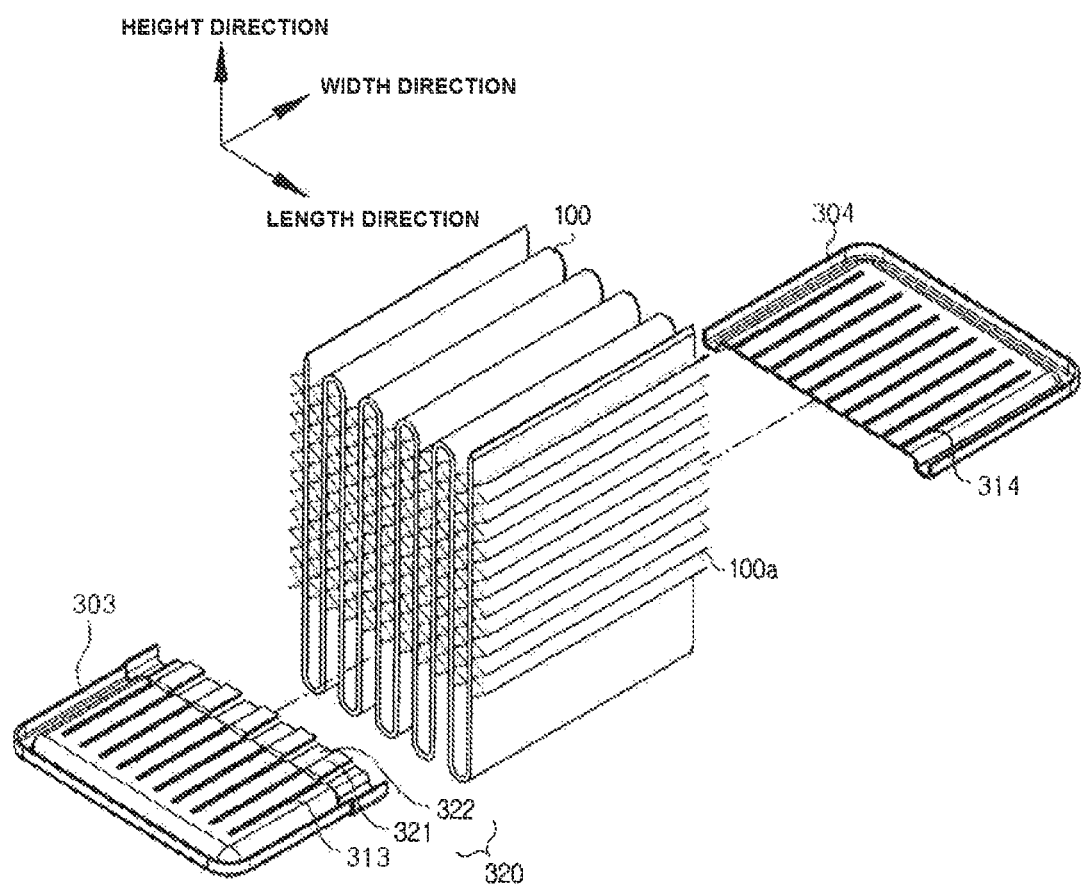
[FIG. 6]

[FIG. 7]
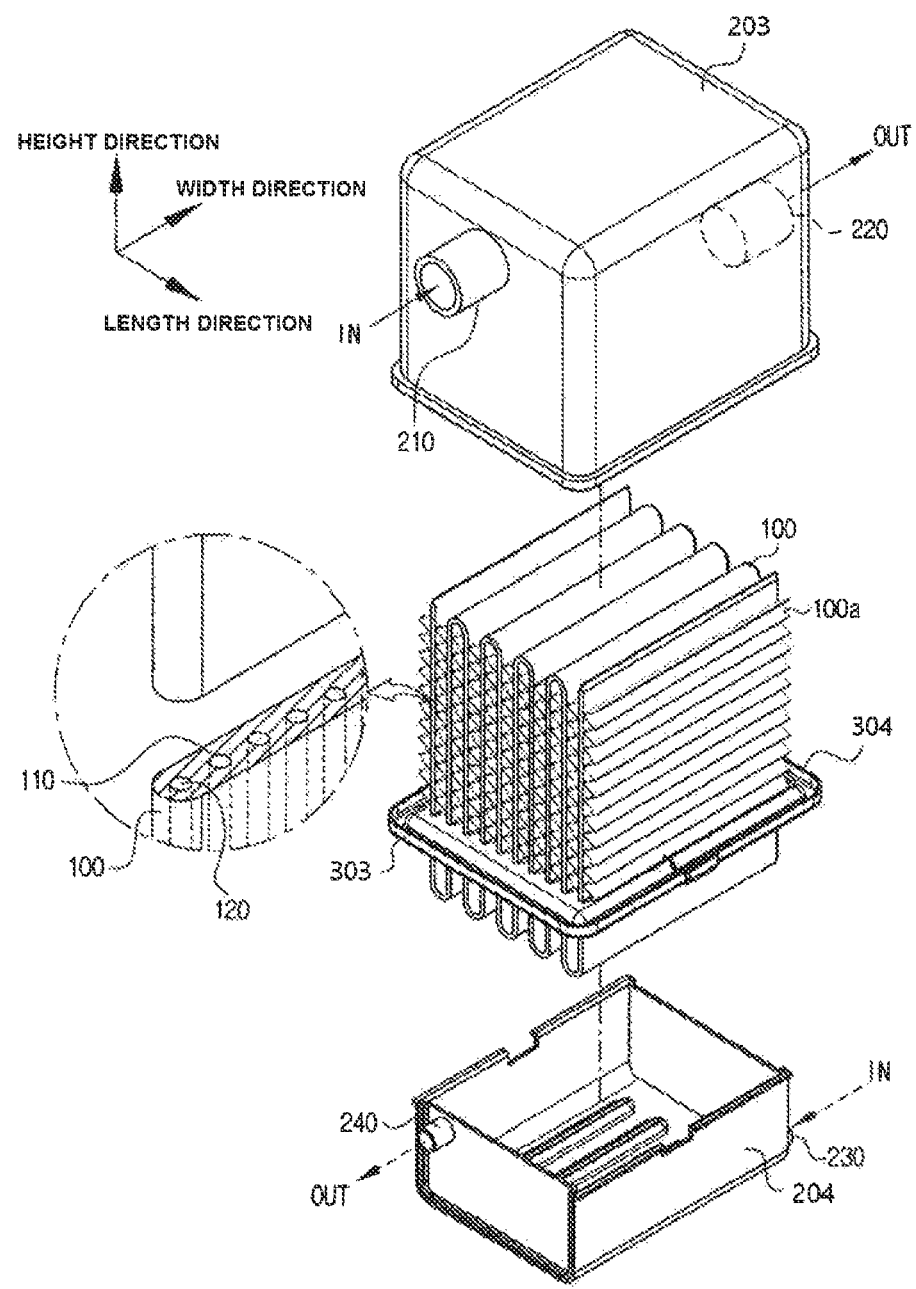

[FIG. 8]
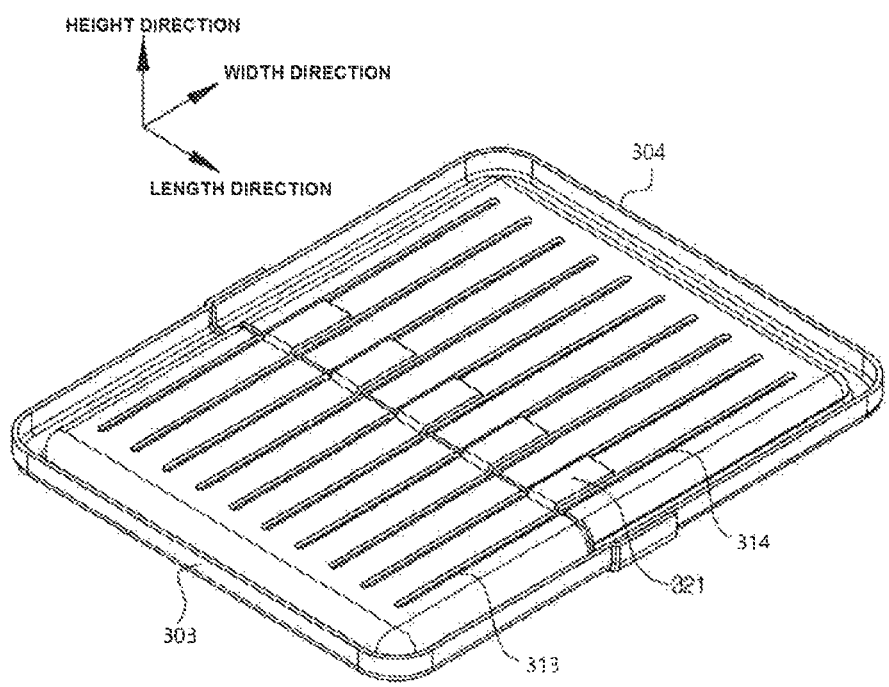

[FIG. 9]
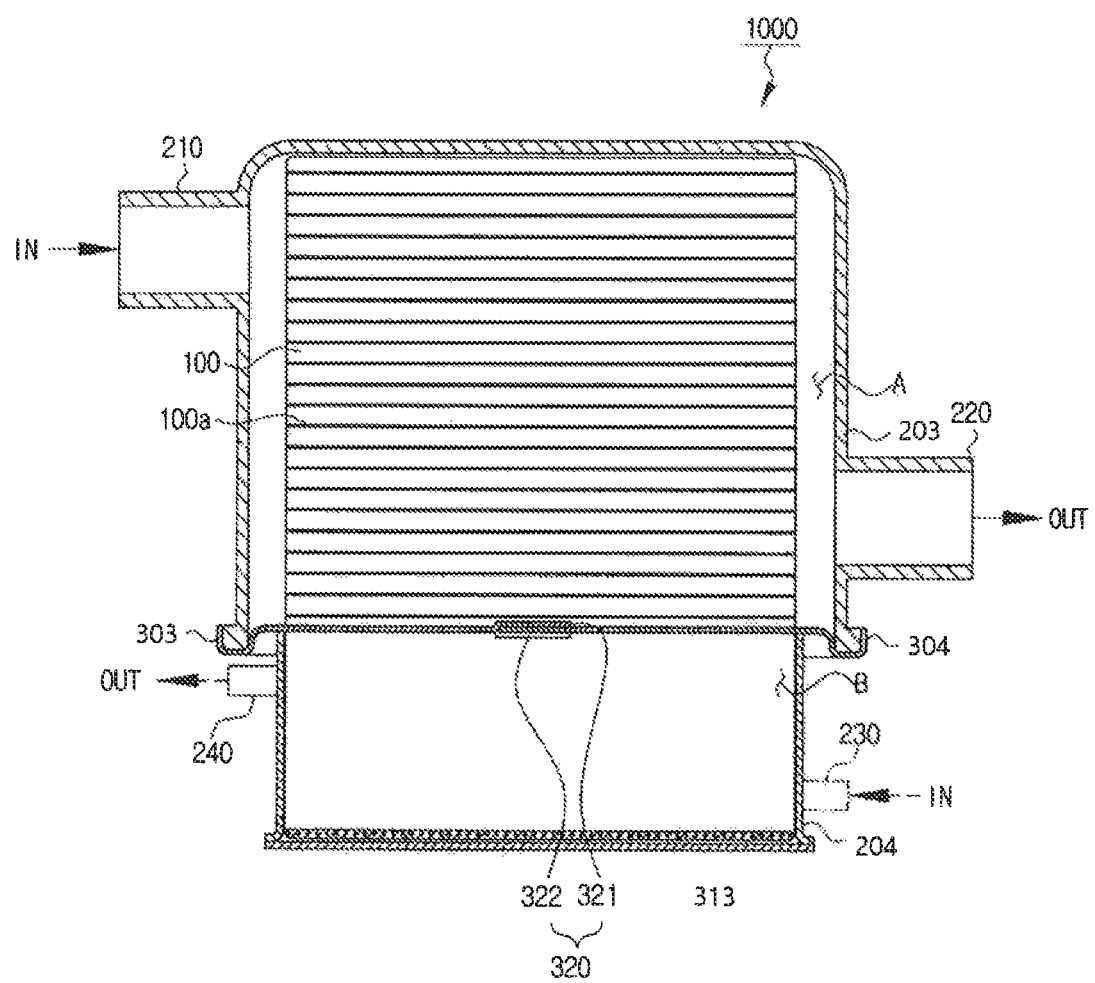

[FIG. 10]
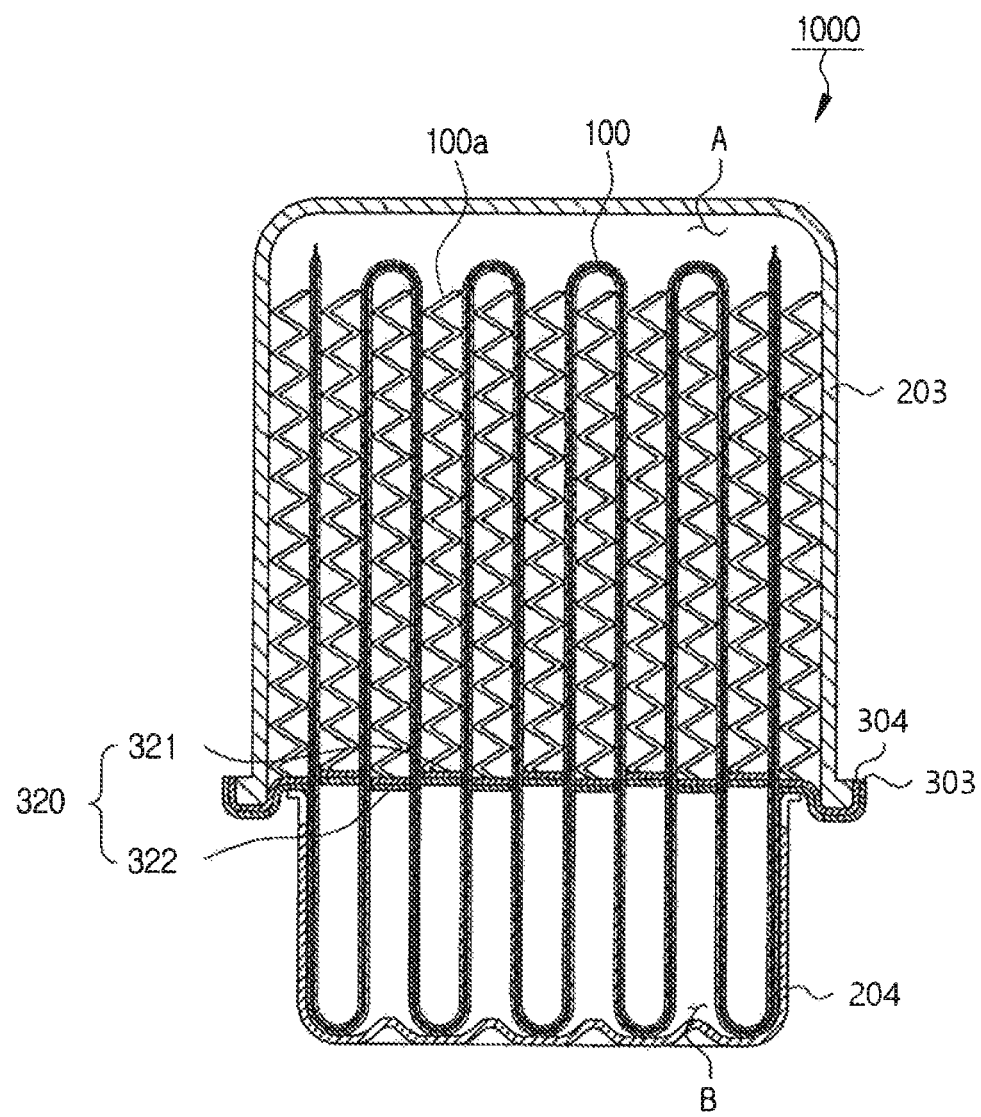

[FIG. 11]
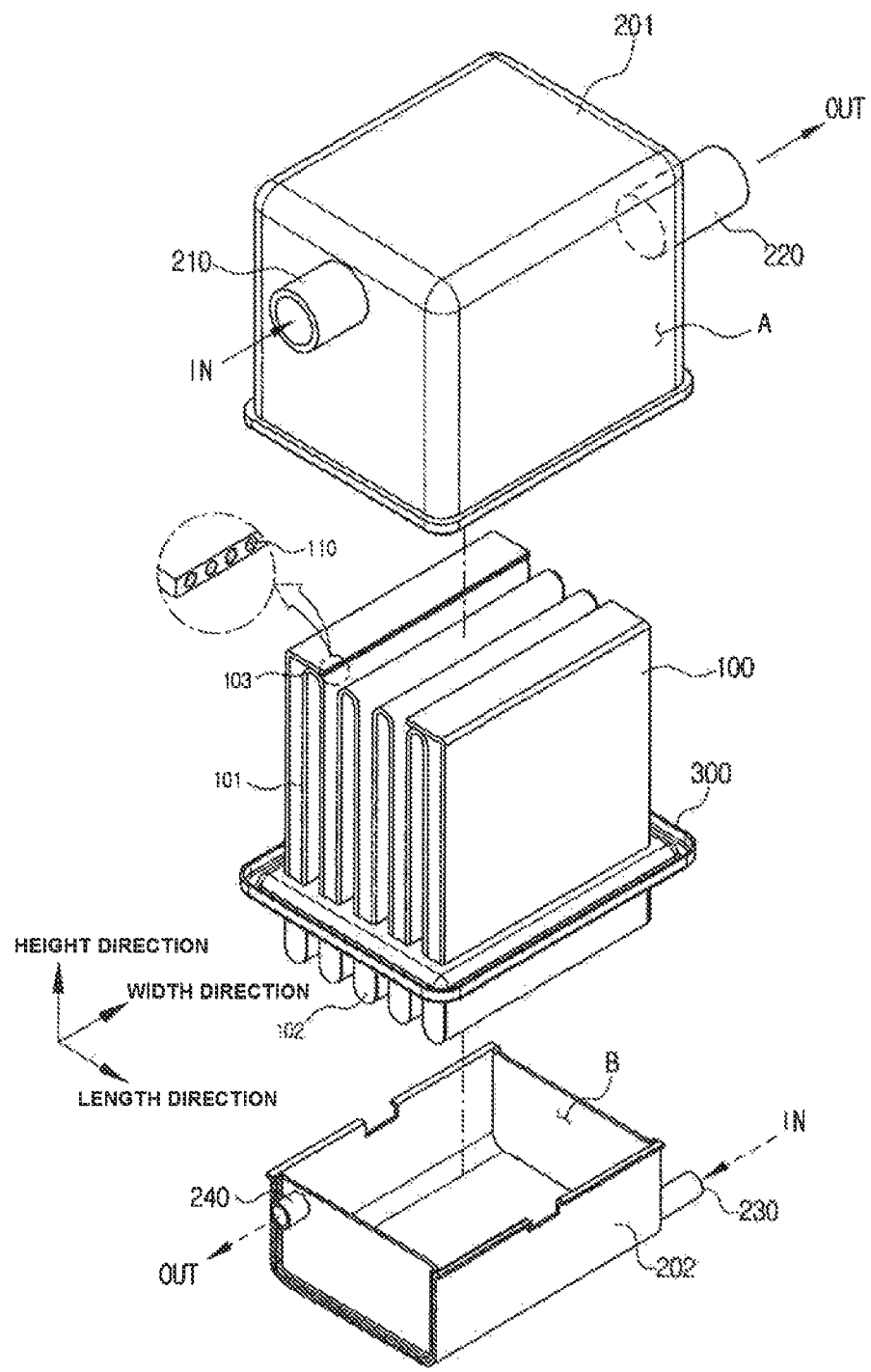

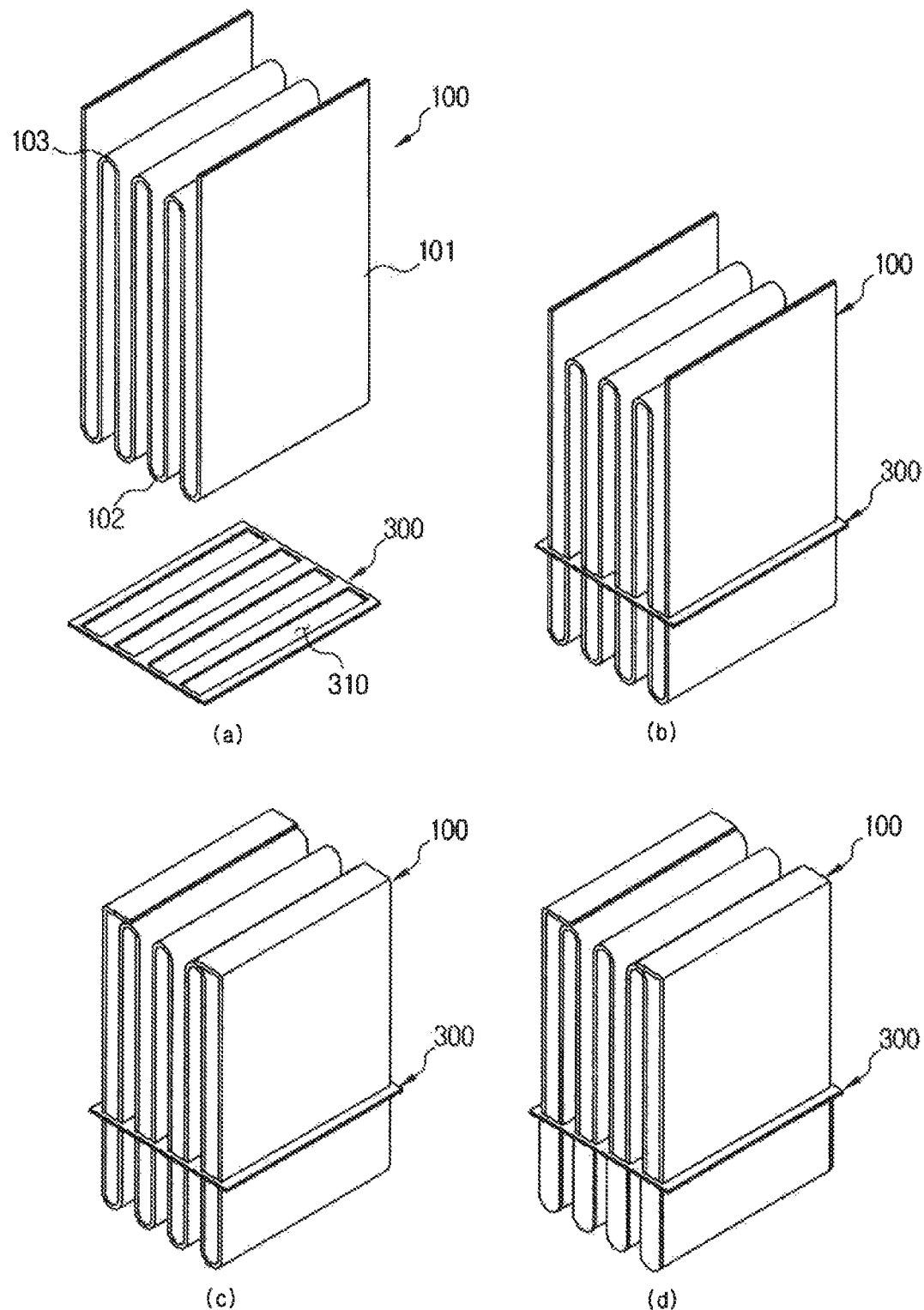
[FIG. 12]

[FIG. 13]
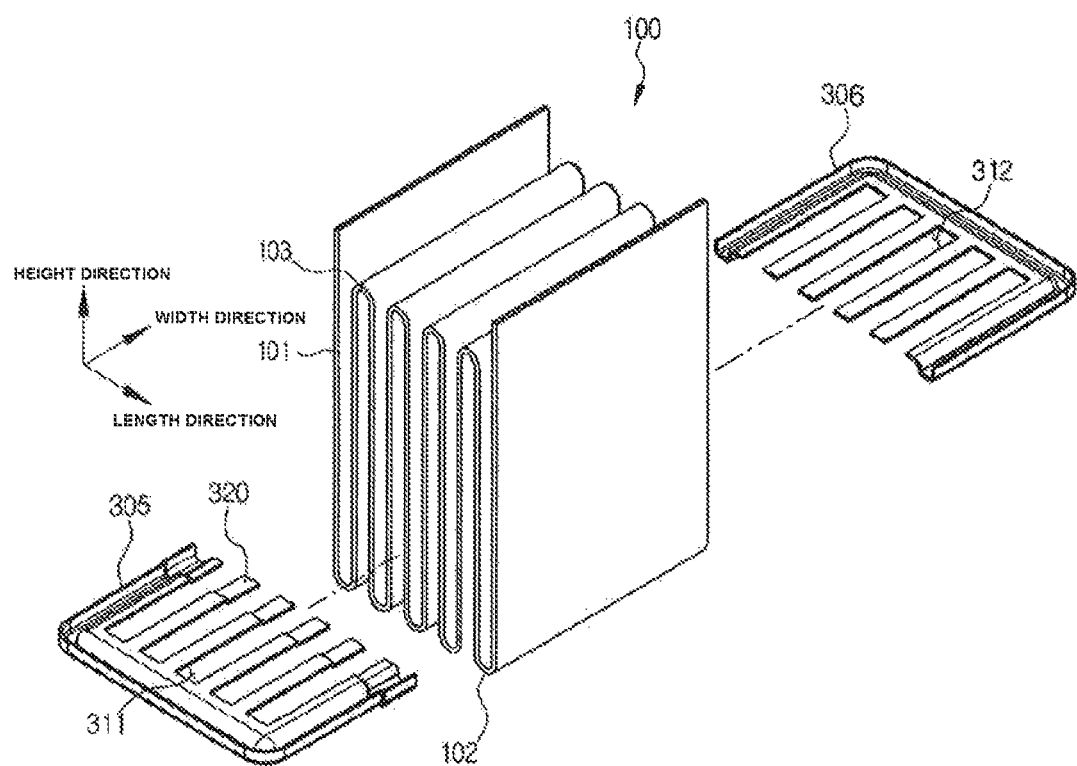

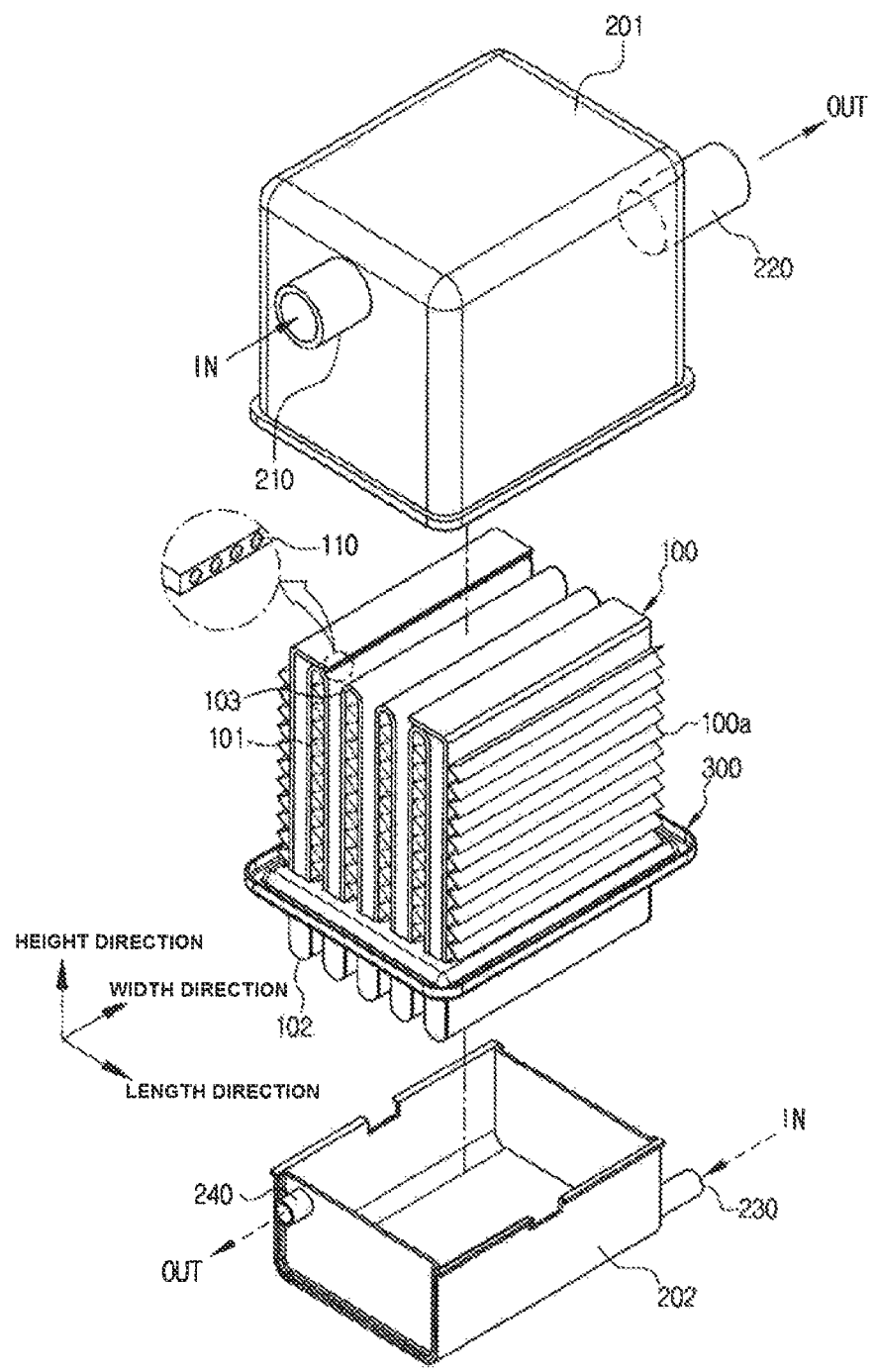
[FIG. 14]

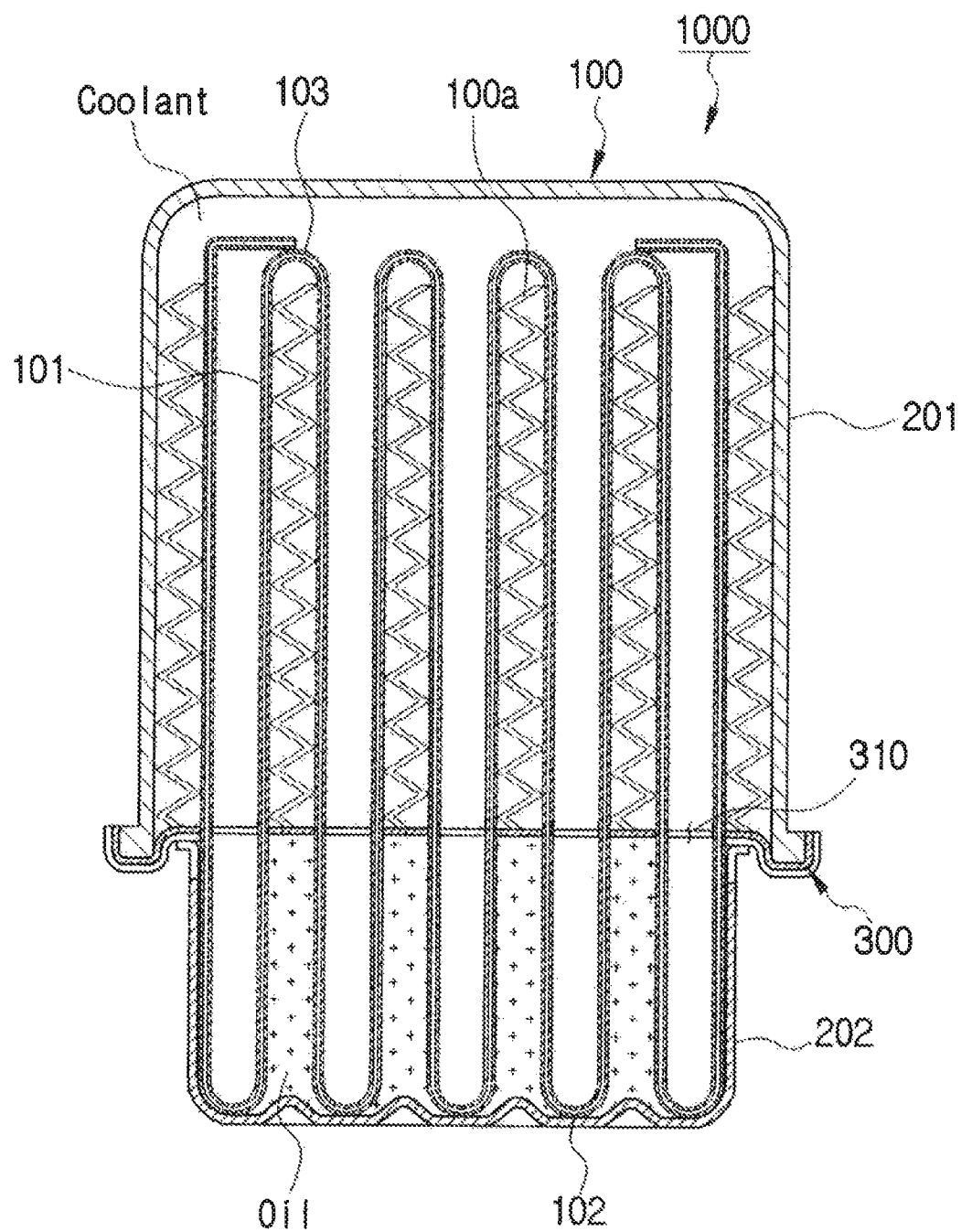
[FIG. 15]

[FIG. 16]
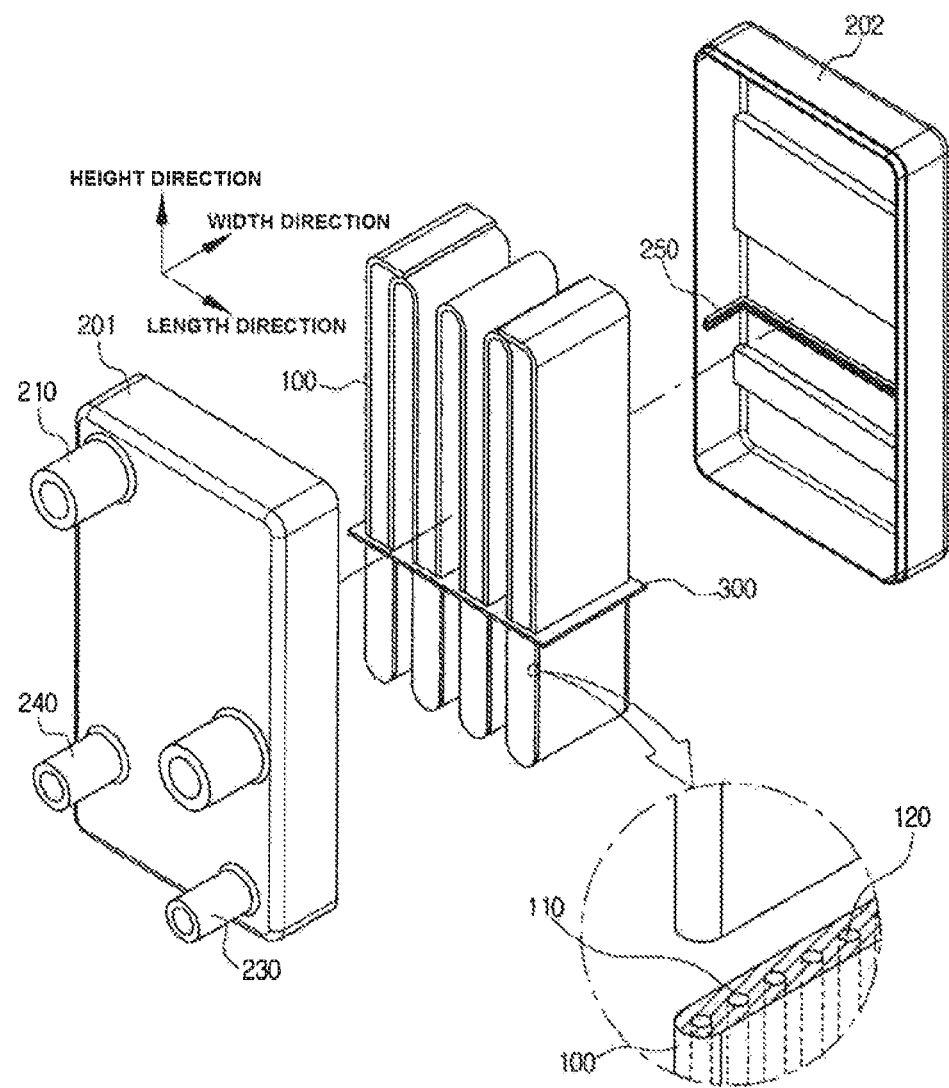

[FIG. 17]
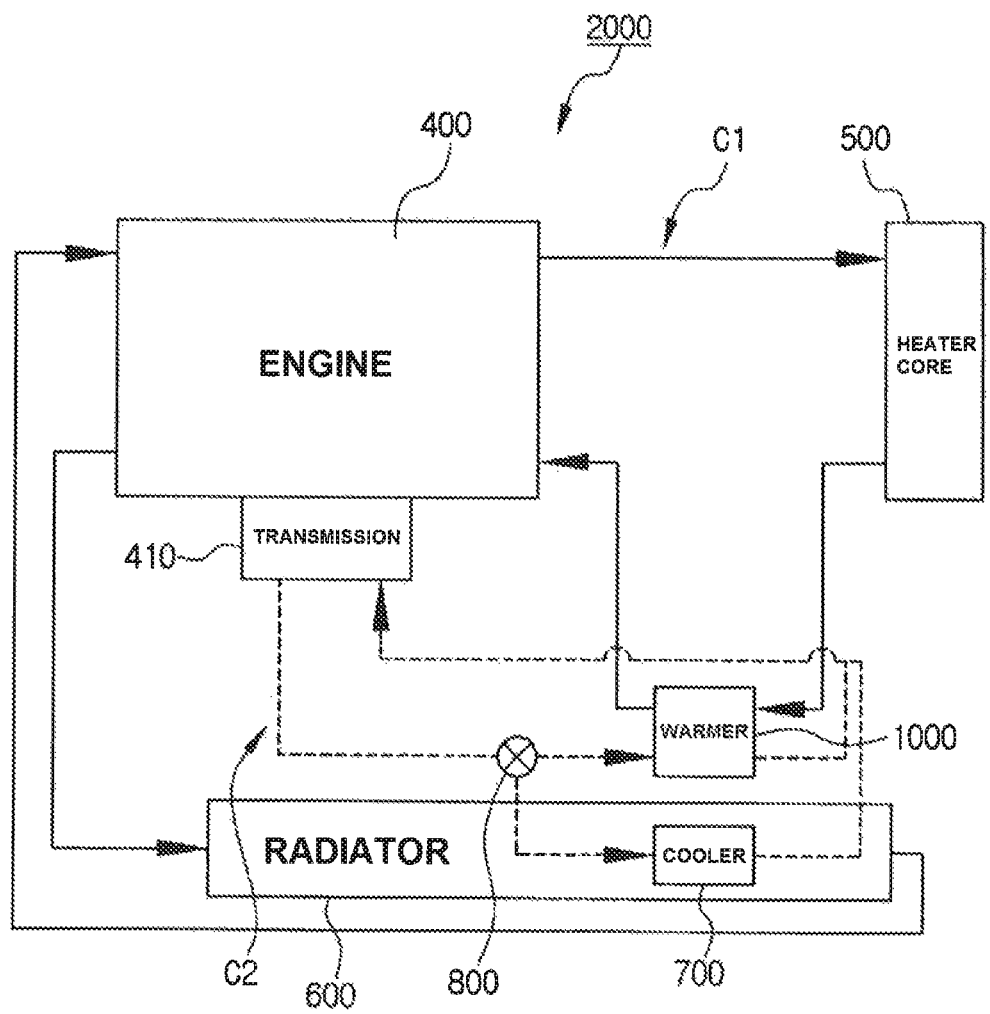

VEHICLE OIL WARMER AND HEAT EXCHANGE SYSTEM

This application is a 371 of International Application No. PCT/KR2016/009081 filed Aug. 18, 2016, which claims priority from Korean Patent Application Nos. 10-2015-0116138 filed Aug. 18, 2015 and 10-2016-0035733 filed Mar. 25, 2016.

TECHNICAL FIELD

The present invention relates to an oil warmer for a vehicle and an oil heat exchange system for a vehicle, and more particularly, to an oil warmer for a vehicle and an oil heat exchange system for a vehicle capable of appropriately controlling a temperature of oil for a transmission by raising the temperature of the oil for a transmission using a warmer to which a high temperature coolant flows when the vehicle initially starts and an external air temperature is low and lowering the temperature of the oil for a transmission using an oil cooler to which a low temperature coolant flows when the vehicle is driven.

BACKGROUND ART

Generally, a vehicle is provided with a cooling system having a form of a heat exchanger such as a radiator or an oil cooler as well as an air conditioning system for cooling the interior of the vehicle.

The radiator is a component for preventing a temperature of an engine from being raised to a predetermined temperature or more, and a high temperature coolant absorbing heat generated by combustion while being circulated in the engine is circulated by a water pump to radiate heat to the outside while passing through the radiator. Therefore, the radiator is a heat exchanger preventing overheat of the engine and allowing an optimal driving state to be maintained.

In addition, oil is filled in a component such as the engine or a transmission of the vehicle in order to perform a lubrication action and maintain air-tightness. However, when the oil becomes excessively hot, a viscosity of the oil is decreased, such that the oil may not appropriately perform the lubrication action and air-tightness maintaining performance. Particularly, lubrication is not appropriately conducted, such that there is a risk that the component such as the engine, or the like will be damaged. A means cooling the oil in order to prevent such a phenomenon is an oil cooler.

Since a large amount of heat is generated from the engine during a period in which the vehicle is driven, the coolant and the oil become hot, and are thus cooled by the radiator and the oil cooler, respectively. Meanwhile, since a viscosity of the oil is increased when a temperature of the oil is lowered, in the case in which an external air temperature is very low in the cold latitudes or in winter, the oil is in a state in which the viscosity is raised to a required viscosity or more at the time of initial starting of the vehicle. However, when the oil in this state is further cooled using the oil cooler, there is a risk that the component such as the engine, or the like will be damaged. Such a phenomenon is called a cold shock, and several methods such as a method in which the oil cooler is not operated at the time of the initial starting, a method of operating a warmer, which is an apparatus of heating the oil, and the like, are used in order to prevent the cold shock.

FIG. 1 is a schematic view illustrating an oil heat exchange system for a vehicle according to the related art.

As illustrated in FIG. 1, in the oil heat exchange system for a vehicle according to the related art, a first circulation line 1 forming a coolant flow in which a coolant heated by an engine 10 passes through a heater core 20 heating air for heating the interior of the vehicle and is then introduced again into the engine 10 to be circulated is formed. Here, the coolant passing through the heater core 20 may be controlled by a first control valve 25 to pass through a warmer 30 and be then introduced into the engine 10 or bypass the warmer 30 without passing through the warmer 30 and be directly introduced into the engine 10. In addition, a second circulation line 2 forming a coolant flow in which the coolant heated by the engine 10 passes through a radiator 50 cooling the coolant using external air and is then introduced again into the engine 10 to be circulated is formed, separately from the first circulation line 1. Here, an oil cooler 40 is mounted in the radiator 50. In addition, a third circulation line 3 is formed so that oil for a transmission is circulated therethrough, and the oil discharged from the transmission 11 is controlled by a second control valve 35 to pass through the warmer 30 or pass through the oil cooler 40 and be then introduced again into the transmission 11 depending on a temperature of the oil.

Here, when the oil is heated while a high temperature coolant passing through the warmer 30 at the time of initial starting of the vehicle, fuel efficiency of the vehicle is improved, but a heat source of the coolant is utilized to heat the oil, and a heat source of the heater core 20 heating the interior of the vehicle using the heat source of the coolant is thus insufficient, such that sufficient heating performance may not be obtained. Therefore, the first control valve (a bypass valve) 25 controlling a flow rate of the coolant introduced into the warmer 30 to heat the oil while securing heating performance of the interior at the time of the initial start of the vehicle is mounted in front of the warmer 30.

In more detail, a wax encapsulation type thermostat of which a volume is changed depending on a temperature is generally used as the first control valve 25. In this case, as a temperature of the coolant introduced into the warmer 30 rises, wax is expanded to open a valve. Therefore, a flow rate of the bypassed coolant is decreased, and a flow rate of the coolant introduced into the warmer 30 is increased to heat the oil.

However, in the oil heat exchange system for a vehicle according to the related art as described above, the first control valve should be mounted in order to control the flow rate of the coolant introduced into the warmer, and a structure of a coolant channel for this purpose becomes complicated, such that it is not easy to manufacture the coolant channel, and pressure loss of the coolant is generated by the first control valve and the complicated coolant channel.

DISCLOSURE

Technical Problem

An object of the present invention is to provide an oil warmer for a vehicle capable of heating oil while securing heating performance of the interior of the vehicle at the time of initial starting of the vehicle by raising a temperature of the oil using a warmer to which a high temperature coolant flows when the vehicle initially starts and an external air temperature is low and allowing a heat exchange amount between the coolant and the oil to be automatically controlled depending on a temperature of the coolant without using a separate bypass valve controlling a flow rate of the coolant.

Another object of the present invention is to provide an oil heat exchange system for a vehicle capable of appropriately controlling a temperature of oil by raising the temperature of the oil using a warmer to which a coolant having a temperature higher than that of the oil flows when the vehicle initially starts and an external air temperature is low and lowering the temperature of the oil using an oil cooler to which a coolant having a temperature lower than that of the oil, flows when the vehicle is driven.

Technical Solution

In one general aspect, an oil warmer 1000 for a vehicle includes: a heat transfer tube 100 having a plurality of fine pipes 110 formed in a width direction therein, formed to corrugate so that valleys and peaks are repeated in a length direction at a predetermined height, and formed to have heat exchange performance changed depending on a temperature by an operating fluid 120 being filled in the fine pipes 110; a case 200 having the heat transfer tube 100 accommodated therein and including a first inlet pipe 210 through which a coolant is introduced, a first outlet pipe 220 through which the coolant is discharged, a second inlet pipe 230 through which oil is introduced, and a second outlet pipe 240 through which the oil is discharged; and a partition member 300 coupled to the heat transfer tube 100 and the case 200 to partition an internal space of the case 200 into upper and lower sides of the case 200 in a height direction, thereby allowing a first space portion A in which the coolant flows to be formed at the upper side and allowing a second space portion B to be formed at the lower side.

When a temperature of the coolant passing through the first space portion A exceeds a predetermined temperature, the operating fluid 120 filled in the fine pipes 110 may flow, such that heat exchange is generated between the coolant and the oil, through the heat transfer tube 100.

The heat transfer tube 100 may be formed of an extruding tube, and may have a form in which plane portions 101 positioned perpendicularly to the length direction and first bent portions 102 and second bent portions 103 formed by roundly bending end portions of the plane portions 101 and each forming the valleys and the peaks are alternated in the length direction.

The heat transfer tube 100 may be formed so that opened both end portions of the fine pipes 110 are closed after the operating fluid 120 is filled in the fine pipes 110.

The case 200 may include first and second cases 201 and 202 separated forward and backward from each other in the width direction and coupled to each other to form a closed internal space, and guide grooves 250 may be formed in the first and second cases 201 and 202, respectively, and a circumference of the partition member 300 may be inserted and coupled into the guide grooves 250.

The case 200 may include first and second cases 201 and 202 separated from each other in the height direction and coupled to each other to form a closed internal space, and the partition member 300 may be disposed and coupled between the first and second cases 201 and 202.

The partition member 300 may include a first partition member 301 in which a plurality of through-holes 311 into which the first bent portions 102 of the heat transfer tube 100 are inserted are formed to be spaced apart from each other in the length direction and a second partition member 302 in which a plurality of through-holes 312 into which the second bent portions 103 of the heat transfer tube 100 are inserted are formed to be spaced apart from each other in the length direction, the first partition member 301 may be fitted into the heat transfer tube 100 from a lower side in the height direction toward an upper side in the height direction, and the second partition member 302 may be fitted into the heat transfer tube 100 from the upper side in the height direction toward the lower side in the height direction, such that the first partition member 301 and the second partition member 302 are closely adhered and coupled to each other.

The first partition member 301, or the second partition member 302 may be formed of a clad member having a clad layer formed on one surface thereof, such that surfaces of the first and second partition members 301 and 302 closely adhered to each other are coupled to each other by brazing.

The partition member 300 may include third and fourth partition members 303 and 304 fitted and coupled into the heat transfer tube 100 at both sides in the width direction, a plurality of slots 313 and 314 of which end portions are opened may be formed in the third and fourth partition members 303 and 304, respectively, so that the plane portions 101 are inserted, and end portions of the third and fourth partition members 303 and 304 in contact with each other may be closely adhered and coupled to each other.

An end portion of the third partition member 303 fitted into the heat transfer tube 100 may be formed as a step portion 320 stepped in the height direction, such that end portions of the third partition member 303 and the fourth partition member 304 meeting each other are coupled to each other so as to overlap each other in the width direction.

Portions of the step portion 320 of the third partition member 303 may be formed as upper step portions 321 stepped upwardly in the height direction, and the other portions thereof may be formed as lower step portions 322 stepped downwardly in the height direction, such that the end portion of the fourth partition member 304 is inserted and coupled between the upper step portions 321 and the lower step portions 322 of the third partition member 303.

The oil warmer 1000 for a vehicle may include fins 100a coupled between the plane portions 101 of the heat transfer tube 100 positioned in the first space portion A.

In the heat transfer tube 100, both side surfaces, in the width direction, of regions forming the valleys while being positioned in the second space portion B in the heat transfer tube 100 may be closed, and in the partition member 300, regions coupled to regions forming the peaks in the heat transfer tube 100 may be closed and regions coupled to the regions forming the valleys in the heat transfer tube 100 may be opened.

Through-holes 310 into which the first bent portions 102 of the heat transfer tube 100 are inserted may be formed in the partition member 300 so as to be spaced apart from each other in the length direction, such that the partition member 300 is fitted and coupled into the heat transfer tube 100 from a lower side in the height direction toward an upper side in the height direction.

The partition member 300 may include fifth and sixth partition members 305 and 306 fitted and coupled into the heat transfer tube 100 at both sides in the width direction, a plurality of slots 311 and 312 of which end portions are opened may be formed in the fifth and sixth partition members 305 and 306, respectively, so that both plane portions 101 extended from the first bent portions 102 are inserted, and end portions of the fifth and sixth partition members 305 and 306 in contact with each other may be closely adhered and coupled to each other.

An end portion of the fifth partition member 305 fitted into the heat transfer tube 100 may be formed as a step portion 320 stepped in the height direction, such that end portions of the fifth partition member 305 and the sixth partition member 306 meeting each other are coupled to each other so as to overlap each other in the width direction.

Portions of the step portion 320 of the fifth partition member 305 may be formed as upper step portions stepped upwardly in the height direction, and the other portions thereof may be formed as lower step portions stepped downwardly in the height direction, such that the end portion of the sixth partition member 306 is inserted and coupled between the upper step portions and the lower step portions of the fifth partition member 305.

In the oil warmer 1000 for a vehicle, the coolant introduced into the first inlet pipe 210 may flow to an inner portion of the first space portion A and spaces formed in inner regions of first bent portions 102 of the heat transfer tube 100.

In another general aspect, an oil heat exchange system 2000 for a vehicle includes: an engine 400 corresponding to an internal combustion engine for a vehicle; a heater core 500 having a coolant heated by the engine 400 and introduced thereinto to heat air for the purpose of heating of the vehicle; a radiator 600 cooling the coolant heated by the engine 400 using external air; a transmission 410; the oil warmer 1000 for a vehicle of claim 1 connected to a rear end of the heater core 500 in series on a first circulation portion C1 through which the coolant discharged from the engine 400 passes through the heater core 500 and is again circulated to the engine 400 to have the coolant introduced into a first space portion A thereof, disposed on a second circulation portion C2 through which oil discharged from the transmission 410 is circulated to have the oil introduced into a second space portion B thereof, and heat-exchanging the coolant and the oil with each other; an oil cooler 700 mounted in the radiator 600, disposed on the second circulation portion C2 so as to be connected to the oil warmer 1000 for a vehicle in parallel to have the oil flowing to an inner portion thereof, and heat-exchanging the coolant and the oil with each other; and an oil controller 800 installed in front of the oil warmer 1000 for a vehicle and the oil cooler 700 on the second circulation portion C2 and controlling a flow of the oil passing through the oil warmer 1000 for a vehicle and the oil cooler 700.

Advantageous Effects

In the oil warmer for a vehicle and the oil heat exchange system for a vehicle according to the present invention, heat exchange between the coolant and the oil is not generated or is generated to heat the oil, depending on a temperature of the coolant without using a separate bypass valve controlling a flow rate of the coolant introduced into the warmer. Therefore, the bypass valve may be removed, and a complicated structure of a channel for controlling a flow of the coolant does not need to be formed, thereby making it possible to simplify a configuration, improve space utilization, and decrease a manufacturing cost.

Further, since the structure of the coolant channel is simplified, pressure loss of the coolant may be decreased.

Further, in the present invention, both side surfaces, in the width direction, of region forming the valleys in a lower region of the heat transfer tube formed to have heat exchange performance changed depending on a temperature of the coolant are closed, and the coolant may also flow in the closed internal regions, such that the oil is overheated. Therefore, when the oil, is cooled, the oil and the coolant may directly exchange heat with each other, such that heat radiation performance may be increased.

Further, the oil heat exchange system for a vehicle according to the present invention may appropriately control a temperature of oil by raising the temperature of the oil using the warmer to which a high temperature coolant flows when the vehicle initially starts and an external air temperature is low and lowering the temperature of the oil using the oil cooler to which a low temperature coolant flows when the vehicle is driven.

DESCRIPTION OF DRAWINGS

FIG. 1 is a schematic view illustrating an oil heat exchange system for a vehicle according to the related art.

FIGS. 2 and 3 are, respectively, an assembled perspective view and an exploded perspective view illustrating an oil warmer for a vehicle according to a first exemplary embodiment of the present invention.

FIG. 4 are perspective views illustrating a process of manufacturing a heat transfer tube of the oil warmer for a vehicle according to a first exemplary embodiment of the present invention and a process of coupling the heat transfer tube to a partition member.

FIGS. 5 to 8 are an assembled perspective view and an exploded perspective view illustrating an oil warmer for a vehicle according to a second exemplary embodiment of the present invention.

FIG. 9 is a cross-sectional view taken along the line A-A' of FIG. 5.

FIG. 10 is a cross-sectional view taken along line B-B' of FIG. 5.

FIGS. 11, 13 and 14 are an assembled perspective view and an exploded perspective view illustrating an oil warmer for a vehicle according to a third exemplary embodiment of the present invention.

FIG. 12 are perspective views illustrating a process of manufacturing a heat transfer tube of the oil warmer for a vehicle according to a third exemplary embodiment of the present invention and a process of coupling the heat transfer tube to a partition member.

FIG. 15 is a cross-sectional view of FIG. 14.

FIG. 16 is an exploded perspective view illustrating an oil warmer for a vehicle according to a fourth exemplary embodiment of the present invention.

FIG. 17 is a schematic view illustrating an oil heat exchange system for a vehicle according to the present invention.

BEST MODE

Hereinafter, an oil warmer for a vehicle and an oil heat exchange system for a vehicle according to the present invention having the configuration as described above will be described in detail with reference to the accompanying drawings.

As illustrated in FIG. 3, an oil warmer 1000 for a vehicle according to a first exemplary embodiment of the present invention may be configured to include a heat transfer tube 100 having a plurality of fine pipes 110 formed in a width direction therein, formed to corrugate so that valleys and peaks are repeated in a length direction at a predetermined height, and formed to have heat exchange performance changed depending on a temperature by an operating fluid 120 being filled in the fine pipes 110; a case 200 having the heat transfer tube 100 accommodated therein and including a first inlet pipe 210 through which a coolant is introduced, a first outlet pipe 220 through the coolant is discharged, a second inlet pipe 230 through which oil is introduced, and a second outlet pipe 240 through which the oil is discharged; and a partition member 300 coupled to the heat transfer tube 100 and the case 200 to partition an internal space of the case 200 into upper and lower sides of the case 200 in a height direction, thereby allowing a first space portion A in which the coolant flows to be formed at the upper side and allowing a second space portion B to be formed at the lower side.

First, the heat transfer tube 100 may be formed to corrugate in a wave shape to have a form in which plane portions 101 positioned perpendicularly to the length direction and first bent portions 102 and second bent portions 103 formed by roundly bending end portions of the plane portions 101 and each forming the valleys and the peaks are alternated in the length direction, and may be formed so that a heat exchange medium may pass therethrough in the width direction. In addition, a plurality of fine pipes 110 of which inner portions are hollowed may be formed along a form of the heat transfer tube 100 formed to corrugate, and it is preferable that a cross section of each of the fine pipes 110 has a circular shape. As illustrated, the heat transfer tube 100 may be formed at a thin thickness, and the fine pipes 110 may be formed to be spaced apart from each other in the width direction. In addition, the operating fluid 120 may be filled in the fine pipes 110. In addition, the fine pipe 110 may be formed of a channel hollowed at a very small diameter so that the operating fluid 120 filled therein may flow by a capillary phenomenon. Therefore, the heat transfer tube 100 may be formed to have heat exchanger performance changed depending on a temperature of a heat exchange medium in contact with the heat transfer tube 100. That is, the heat transfer tube 100 may be a vibration fine pipe type heat pipe, and in the case in which a temperature of a heat exchange medium in contact with the vibration fine pipe type heat pipe is low, the operating fluid 120 filled in the vibration fine pipe type heat pipe is not oscillated, such that heat exchange performance is low, but in the case in which the temperature of the heat exchange medium in contact with the vibration fine pipe type heat pipe exceeds a predetermined temperature, the operating fluid 120 filled in the vibration fine pipe type heat pipe may be oscillated to move a large amount of heat, such that heat exchange performance is increased.

The case 200 is to surround and close the heat transfer tube 100, such that the heat transfer tube 100 may be disposed in an internal space of the case 200. Here, the internal space of the case 200 may be a flow space through which the coolant, which is one of two heat exchanger media, and the oil, which is the other of the two heat exchanger media, pass. In addition, the first inlet pipe 210 through which the coolant is introduced and the first outlet pipe 220 through which the coolant is discharged may be formed at the upper side of the case 200 in the height direction, and the second inlet pipe 230 through which the oil is introduced and the second outlet pipe 240 through which the oil is discharged may be formed at the lower side of the case 200 in the height direction.

Here, the partition member 300 is coupled to the heat transfer tube 100 and the case 200. The partition member 300 is formed perpendicularly to the height direction to partition the internal space of the case 200 into two spaces of the upper and lower sides of the case 200 in the height direction. That is, due to the partition member 300, the first space portion A in which the coolant flows may be formed at the upper side of the case 200 in the height direction, and the second space portion B in which the oil flows may be formed at the lower side of the case 200 in the height direction. Here, an upper side of the heat transfer tube 100 is disposed in the first space portion A, and a lower side of the heat transfer tube 100 is disposed in the second space portion B, such that the coolant and the oil may be heat-exchanged with each other through the heat transfer tube 100. Here, the first inlet pipe 210 and the first outlet pipe 220 may be formed in the first space portion A formed in the case 200 so that the coolant is introduced into and discharged from the first space portion A, and the second inlet pipe 230 and the second outlet pipe 240 may be formed in the second space portion B so that the oil is introduced into and discharged from the second space portion B.

Therefore, the oil warmer for a vehicle according to the present invention is characterized in that a separate bypass valve controlling a flow rate of a coolant introduced into the warmer is removed and the heat transfer tube having heat exchange performance changed depending on a temperature of the coolant is used. When the temperature of the coolant passing through the first space portion A exceeds a predetermined temperature, the operating fluid 120 in the fine pipes 110 of the heat transfer tube 100 flows, such that heat exchange is generated between the coolant and the oil through the heat transfer tube 100.

That is, when the temperature of the coolant is the predetermined temperature or less, heat exchange is partially generated between the coolant and the oil through heat conduction of the heat transfer tube 100 itself, such that the heat exchange performance is low, but when the temperature of the coolant exceeds the predetermined temperature, the operating fluid 120 filled in the fine pipes 110 is heated and gasified by the coolant like a principle of a heat pipe, to generate active heat transfer while flowing or being circulated in the fine pipes 110, such that the heat exchange performance may be increased. Here, a temperature at which the heat exchange performance is rapidly increased may be changed depending on a kind or a filling rate of operating fluid 120 filled in the fine pipes 110.

Therefore, the bypass valve controlling the flow rate of the coolant introduced into the warmer is removed, such that a complicated structure of a channel for controlling a flow of the coolant does not need to be formed, thereby making it possible to simplify a configuration, improve space utilization, and decrease a manufacturing cost. In addition, since the structure of the channel in which the coolant flows is simplified, flow pressure loss of the coolant may be decreased.

In addition, the heat transfer tube 100 may be formed of an extruding tube, may be bent to corrugate, and may be formed so that opened both ends of the fine pipes 110 are closed after the operating fluid 120 is filled in the fine pipes 110 of the heat transfer tube 100.

That is, the heat transfer tube 100 may be manufactured as a linear tube having a flat plate shape by extrusion molding using aluminum, and the fine tubes 110 may be simultaneously formed in the heat transfer tube 100 at the time of performing extrusion. In addition, the linear tube may be bent in a wave form to corrugate. In addition, since the tube manufactured by the extrusion molding has a form in which both ends of the fine pipes 110 are opened, the opened both ends of the bent tube are directed toward an upward direction, such that the operating fluid 120 may be filled in the fine pipes 110. Then, the both ends of the tube may be closed to prevent the operating fluid 120 filled in the fine pipes 110 from being leaked to the outside. In this case, the both ends of the tube may be closed through compression or be closed by various forms and methods.

As illustrated in FIG. 3, the case 200 may be configured to include first and second cases 201 and 202 separated forward and backward from each other in the width direction, coupled to each other to form an internal space, and closing the internal space, and guide grooves 250 may be formed in inner central portions of the first and second cases 201 and 202, respectively, and outer edges of the partition member 300 are inserted into the guide grooves 250, such that the partition member 300 may be fixed at a predetermined height.

That is, in the case 200, the first and second cases 201 and 202, which are two members, may be coupled to each other to form the internal space, and as illustrated, a circumference of the first and second cases 201 and 202 in contact with each other may be bonded to each other and be closed. In addition, the guide grooves 250 are formed in inner surfaces of the first and second cases 201 and 202, respectively, and outer circumferences of the partition member 300 may be inserted and coupled into the guide grooves 250. Here, gaskets or sealing members are inserted into the guide groove 250 and are coupled to the guide groove 250 so as to close the guide groove 250, thereby preventing fluids flowing in the first space portion A and the second space portion B from being mixed with each other.

In addition, protruding portions 260 may be formed toward the heat transfer tube 100 on the inner surfaces of the first and second cases 201 and 202, and may be formed in regions corresponding to the first space portion A and the second space portion B. Therefore, due to the protruding portions 260, the coolant introduced into the first inlet pipe 210 may flow and be dispersed in the length direction, flow in the height direction along regions between the heat transfer tube 100, again flow and be collected in the length direction, and be discharged through the first outlet pipe 220. Therefore, the coolant may be dispersed to uniformly transfer heat to the heat transfer tube 100. Likewise, the oil introduced into the second inlet pipe 230 may flow and be dispersed in the length direction, flow in the height direction along regions between the heat transfer tube 100, again flow and be collected in the length direction, and be discharged through the second outlet pipe 240. Therefore, the oil may be dispersed to uniformly transfer heat to the heat transfer tube 100. Here, the protruding portion 260 may also be formed on only any one of the first and second cases 201 and 202.

As illustrated in FIG. 4, the partition member 300 may be configured to include a first partition member 301 in which a plurality of through-holes 311 into which the first bent portions 102 of the heat transfer tube 100 are inserted are formed to be spaced apart from each other in the length direction and a second partition member 302 in which a plurality of through-holes 312 into which the second bent portions 103 of the heat transfer tube 100 are inserted are formed to be spaced apart from each other in the length direction, the first partition member 301 is fitted into the heat transfer tube 100 from a lower side in the height direction toward an upper side in the height direction, and the second partition member 302 is fitted into the heat transfer tube 100 from the upper side in the height direction toward the lower side in the height direction, such that the first partition member 301, and the second partition member 302 may be closely adhered and coupled to each other.

This is to allow the partition member 300 to partition spaces between the plane portions 101 of the heat transfer tube 100 into upper and lower spaces in the height direction and close the upper and lower spaces. As illustrated in FIG. 4, the partition member 300 is formed the two sheets, one of the two sheets is fitted into a corrugate heat transfer tube 100 from the upper side in the height direction and the other of the two sheets is fitted into the corrugate heat transfer tube 100 from the lower side in the height direction, such that the two sheets are closely adhered and coupled to each other, and the through-holes 311 of the first partition member 301 and the through-holes 312 of the second partition member 302 are formed to be mismatched to each other, such that when the partition members of the two sheets are stacked in a vertical direction and are closely adhered and coupled to each other, regions where the through-holes are formed between the heat transfer tubes 100 may be partitioned to be closed.

In addition, the first partition member 301 or the second partition member 302 is formed of a clad member having a clad layer formed on one surface thereof, such that surfaces of the first and second partition members 301 and 302 closely adhered to each other may be coupled to each other by brazing.

That is, the two partition members may be bonded to each other using a separate adhesive, or the like, but the first partition member 301 or the second partition member 302 is formed of the clad member having the clad layer formed on one surface thereof, such that the first and second partition members 301 and 302 are coupled to each other by the brazing. Therefore, the first and second partition members 301 and 302 may be securely coupled to each other and closed, and contact surfaces between the partition member 300 and the heat transfer tube 100 may also be closed by the clad layer melted at the time of brazing of the first and second partition members 301 and 302.

In the case 200 according to a first exemplary embodiment of the present invention, the first and second cases 201 and 202 are coupled to each other at both sides in the width direction. However, the first and second cases 201 and 202 may also be formed to be coupled to each other at both sides in the height direction or the length direction.

As illustrated in FIG. 7, in a case 200 included in an oil warmer 1000 for a vehicle according to a second exemplary embodiment of the present invention, a third case 203 may be coupled to a fourth case 204 from an upper side in the height direction toward a lower side in the height direction, the fourth case 204 may be coupled to the third case 203 from the lower side in the height direction toward the upper side in the height direction, and the third case 203 and the fourth case 204 may be coupled to each other so that circumferences thereof are closely adhered to third and fourth partition members 303 and 304. In addition, the third case 203 may have a first inlet pipe 210 formed at one side thereof and a first outlet pipe 220 formed at the other side thereof, and the fourth case 204 may have a second inlet pipe 230 formed at one side thereof and a second outlet pipe 240 formed at the other side.

In addition, fins 100a may be coupled between the plane portions of the heat transfer tube 100 so as to easily transfer heat.

In addition, the partition member 300 may be configured to include third and fourth partition members 303 and 304 fitted and coupled into the heat transfer tube 100 at both sides in the width direction, a plurality of slots 313 and 314 of which end portions are opened may be formed in the third and fourth partition members 303 and 304, so that the plane portions 101 of the heat transfer tube 100 are inserted, and end portions of the third and fourth partition members 303 and 304 in contact with each other may be closely adhered and coupled to each other.

This is to allow the partition member 300 to partition spaces between the plane portions 101 of the heat transfer tube 100 into upper and lower spaces in the height direction and close the upper and lower spaces. As illustrated in FIGS. 6 to 8, the partition member 300 may be configured to include the third partition member 303 fitted into the heat transfer tube 100 from a front side in the width direction toward a rear side in the width direction and the fourth partition member 304 fitted into the heat transfer tube 100 from the rear side in the width direction toward the front side in the width direction. The slots 313 having a thickness corresponding to that of the heat transfer tube 100 are formed in the third partition member 303. Here, the slot 313 may be formed in a form in which the end portions thereof are opened so that the third partition member 303 may be fitted into the heat transfer tube 100. Likewise, the slots 314 having a thickness corresponding to that of the heat transfer tube 100 are formed in the fourth partition member 304. Here, the slots 314 may be formed in a form in which the end portions thereof are opened so that the fourth partition member 304 may be fitted into the heat transfer tube 100. Therefore, the two sheets of partition members are fitted into the heat transfer tube 100 in the width direction, such that the end portions of the two partition members may be closely adhered and coupled to each other, and when the end portions of the two partition members are closely adhered and coupled to each other, regions between the heat transfer tube 100 may be partitioned so as to be closed in the height direction.

In addition, an end portion of the third partition member 303 fitted into the heat transfer tube 100 is formed as a step portion 320 stepped in the height direction, such that end portions of the third partition member 303 and the fourth partition member 304 meeting each other may be coupled to each other so as to overlap each other in the width direction.

A surface of the end portion of the third partition member 303 in the width direction and a surface of the end portion of the fourth partition member 304 in the width direction may be in contact with each other to be closely adhered and coupled to each other, but in this case, coupling force and closing force may be reduced. Therefore, the end portion of the third partition member 303 and the end portion of the fourth partition member 304 overlap each other by a predetermined width in the width direction, such that the end portions may be closely adhered and coupled to each other in a form in which they are partially stacked in the height direction. Here, the step portion 320 may be formed in the third partition member 303 or be formed in the fourth partition member 304.

In addition, portions of the step portion 320 of the third partition member 303 are formed as upper step portions 321 stepped upwardly in the height direction, and the other portions thereof are formed as lower step portions 322 stepped downwardly in the height direction, such that the end portion of the fourth partition member 304 may be inserted and coupled between the upper step portions 321 and the lower step portions 322 of the third partition member 303.

Portions of the step portion 320 are formed as the upper step portions 321 and the other portions thereof are formed as the lower step portions 322, such that the step portion 320 has a structure in which the upper step portions 321 and the lower step portions 322 are formed together. Therefore, the end portion of the fourth partition member 304 is inserted and coupled between the upper step portions 321 and the lower step portions 322 formed in the third partition member 303, such that the third and fourth partition members 303 and 304 may be easily assembled to each other, and the third and fourth partition members 303 and 304 may not be easily separated from each other even in a state in which they are not assembled and bonded to each other. Therefore, movement of the third and fourth partition members 303 and 304 to a brazing process, or the like, for bonding may be very easy, and a separate jig for fixing the two partition members of the two sheets in order to perform the brazing may not be used.

As illustrated in FIG. 11, an oil warmer 1000 for a vehicle according to a third exemplary embodiment of the present invention may be configured to include a heat transfer tube 100 having a plurality of fine pipes 110 formed in a width direction therein, formed to corrugate so that valleys and peaks are repeated in a length direction at a predetermined height, and formed to have heat exchange performance changed depending on a temperature by an operating fluid 120 being filled in the fine pipes 110; a case 200 having the heat transfer tube 100 accommodated therein and including a first inlet pipe 210 through which a coolant is introduced, a first outlet pipe 220 through the coolant is discharged, a second inlet pipe 230 through which oil is introduced, and a second outlet pipe 240 through which the oil is discharged; and a partition member 300 coupled to the heat transfer tube 100 and the case 200 to partition an internal space of the case 200 into upper and lower sides of the case 200 in a height direction, thereby allowing a first space portion A in which the coolant flows to be formed at the upper side and allowing a second space portion B to be formed at the lower side, wherein in the heat transfer tube 100, both side surfaces, in the width direction, of regions forming the valleys while being positioned in the second space portion B in the heat transfer tube 100 are closed, and in the partition member 300, regions coupled to regions forming the peaks in the heat transfer tube 100 are closed and regions coupled to the regions forming the valleys in the heat transfer tube 100 are opened.

Since basic components of the oil warmer 1000 for a vehicle according to a third exemplary embodiment of the present invention are similar to those of the oil warmers 1000 for a vehicle according to the first and second exemplary embodiments of the present invention described above, a detailed description for detailed components will be omitted, and only components different from the components described above will be described in detail.

The heat transfer tube 100 may have a form in which plane portions 101 positioned perpendicularly to the length direction and first bent portions 102 and second bent portions 103 formed by roundly bending end portions of the plane portions 101 and each forming the valleys and the peaks are alternated in the length direction, and the plane portions 101 are disposed in the plural so as to be spaced apart from each other by a predetermined distance in the length direction, such that a heat exchange medium such as the coolant or the oil flows in the width direction.

In addition, as illustrated in FIG. 7, fins 100a are interposed between the plane portions of the heat transfer tube 100 positioned in the first space portion A so as to easily transfer heat. Here, the fins 100a are interposed between only the plane portions 101 extended from both ends of the second bend portions 103.

Unlike the first and second exemplary embodiments, as illustrated in FIGS. 11 to 12, in a third exemplary embodiment, in the heat transfer tube 100, both side surfaces, in the width direction, of the first bent portions 102 forming the valleys in a predetermined region of the heat transfer tube 100 below the partition member 300 in the height direction are formed to be closed.

In addition, as illustrated in FIGS. 12 and 13, the partition member 300 is formed to be coupled to and close inner regions of the second bent portions 103 forming the peaks while being positioned in the first space portion A in the heat transfer tube 100 and open inner regions of the first bent portions 102 forming the valleys while being positioned in the second space portion B in the heat transfer tube 100. To this end, through-holes 310 into which the first bent portions 102 of the heat transfer tube 100 are inserted are formed in the partition member 300 so as to be spaced apart from each other in the length direction, such that the partition member 300 is fitted and coupled into the heat transfer tube 100 from a lower side in the height direction toward an upper side in the height direction. Therefore, the coolant flows to an inner portion of the first space portion A and spaces formed in the inner regions of the first bent portions 102 of the heat transfer tube 100, such that the oil and the coolant may be directly heat-exchanged with each other.

An exemplary embodiment of FIG. 12 will be described. The partition member 300 in which a plurality of through-holes 310 are formed is fixed into the heat transfer tube 100, and is then coupled and fixed to the heat transfer tube 100 by brazing. Here, the heat transfer tube 100 includes separate closing means mounted on both side surfaces, in the width direction, of a region including the first bent portions 102 positioned in the second space portion B before brazing, such that the heat transfer tube 100 may be brazed together with the partition member 300. Then, the operating fluid 120 is filled in the fine pipes 110 of the heat transfer tube 100, and both ends of the fine pipes 110 are closed.

As illustrated in FIG. 13, the partition member 300 may be configured to include fifth and sixth partition members 305 and 306 fitted and coupled into the heat transfer tube 100 at both sides in the width direction, a plurality of slots 311 and 312 of which end portions are opened may be formed in the fifth and sixth partition members 305 and 306, respectively, so that both plane portions 101 extended from the first bent portions 102 are inserted, and end portions of the fifth and sixth partition members 305 and 306 in contact with each other may be closely adhered and coupled to each other.

Here, the slots 311 and 312 are opened by a distance by which the both plane portions 101 extended from the first bent portions 102 are spaced apart from each other, and may be formed so that the coolant flowing in the first space portion A may also flow to the inner regions of the first bent portions 102.

In addition, an end portion of the fifth partition member 305 or the sixth partition member 306 fitted into the heat transfer tube 100 is formed as a step portion 320 stepped in the height direction, such that predetermined regions of end portions of the fifth partition member 305 and the sixth partition member 306 meeting each other may be coupled to each other so as to overlap each other.

As illustrated in FIGS. 11 and 14, the case 200 may be configured to include first and second cases 201 and 202 separated from each other in the height direction, and the first and second cases 201 and 202 may coupled to each other so that circumferences thereof are closely adhered to the partition member 300.

The first inlet pipe 210 and the first outlet pipe 220 are formed in the first case 201, positioned at the upper side. Here, it is preferable that the first inlet pipe 210 and the first outlet pipe 220 are formed at one side and the other side of the first case 201 in the width direction, respectively, so that they are in parallel with a direction in which the coolant flowing to spaces between the plane portions 101 of the heat transfer tube 100 is introduced and discharged. In addition, the second inlet pipe 230 and the second outlet pipe 240 are formed in the second case 202 positioned at the lower side. Here, it is preferable that the second inlet pipe 230 and the second outlet pipe 24 are formed at one side and the other side of the second case 202 in the width direction, respectively, so that they are in parallel with a direction in which the oil flowing to spaces formed in the inner regions of the second bent portions 103 among the spaces between the plane portions 101 of the heat transfer tube 100 is introduced and discharged. Therefore, the coolant introduced into the first inlet pipe 210 flows to the inner portion of the first space portion A and the spaces formed in the inner regions of the first bent portions 102 of the heat transfer tube 100. Since the coolant may flow to the spaces formed in the inner regions of the first bent portions 102 of the heat transfer tube 100, the oil and the coolant may be directly heat-exchanged with each other, such that heat radiation performance may be increased.

Here, it is preferable that the first and second inlet pipes 210 and 230 and the first and second outlet pipes 220 and 240 are formed in opposite directions to allow the coolant and the oil to flow in opposite directions.

In addition, it is preferable that the first inlet pipe 210 and the first outlet pipe 220, and the second inlet pipe 230 and the second outlet pipe 240 are not positioned on the same line, but are formed to be spaced apart from each other in the length direction or the height direction to allow the coolant and the oil to uniformly flow over the entire regions in the first space portion A and the second space portion B.

As illustrated in FIG. 16, an oil warmer 1000 for a vehicle according to a fourth exemplary embodiment of the present invention may be configured to include first and second cases 201 and 202 separated forward and backward from each other in the width direction.

Here, a first inlet pipe 210 and a first outlet pipe 220 may be formed in a region forming the first space portion A in the first case 201 or the second case 202, and a second inlet pipe 230 and a second outlet pipe 240 may be formed in a region forming the second space portion B in the first case 201 or the second case 202. As illustrated in FIG. 16, both of the first inlet pipe 210 and the first outlet pipe 220 may be formed in any one of the first case 201 and the second case 202 or one of the first inlet pipe 210 and the first outlet pipe 220 may be formed in the first case 201 and the other thereof may be formed in the second case 202, and the same goes for the second inlet pipe 230 and the second outlet pipe 240.

Since basic components of the oil warmer 1000 for a vehicle according to a fourth exemplary embodiment of the present invention are similar to those of the oil warmers 1000 for a vehicle according to the first to third exemplary embodiments of the present invention described above, a detailed description for detailed components will be omitted.

FIG. 17 is a schematic view illustrating an oil heat exchange system for a vehicle according to the present invention.

As illustrated in FIG. 7, the oil heat exchange system 2000 for a vehicle according to the present invention may be configured to include an engine 400 corresponding to an internal combustion engine for a vehicle; a heater core 500 having a coolant heated by the engine 400 and introduced thereinto to heat air for the purpose of heating of the vehicle; a radiator 600 cooling the coolant heated by the engine 400 using external air; a transmission 410; an oil warmer 1000 for a vehicle of any one of claims 1 to 24 connected to a rear end of the heater core 500 in series on a first circulation portion C1 through which the coolant discharged from the engine 400 passes through the heater core 500 and is again circulated to the engine 400 to have the coolant introduced into a first space portion A thereof, disposed on a second circulation portion C2 through which oil discharged from the transmission 410 is circulated to have the oil introduced into a second space portion B thereof, and heat-exchanging the coolant and the oil with each other; an oil cooler 700 mounted in the radiator 600, disposed on the second circulation portion C2 so as to be connected to the oil warmer 1000 for a vehicle in parallel to have the oil flowing to an inner portion thereof, and heat-exchanging the coolant and the oil with each other; and an oil controller 800 installed in front of the oil, warmer 1000 for a vehicle and the oil cooler 700 on the second circulation portion C2 and controlling a flow of the oil passing through the oil warmer 1000 for a vehicle and the oil cooler 700.

The oil warmer 1000 for a vehicle may be connected to the rear end of the heater core 500 in series on the first circulation portion C1 through which the coolant discharged from the engine 400 passes through the heater core 500 and is again circulated to the engine 400 to have the coolant introduced into the first space portion A thereof, may be disposed on the second circulation portion C2 through which the oil discharged from the transmission 410 is circulated to have the oil introduced into the second space portion B thereof, and may heat-exchange the coolant and the oil with each other. That is, since the oil warmer 1000 for a vehicle is formed to have heat exchange performance changed depending on a temperature, the oil warmer 1000 for a vehicle may be installed on the first circulation portion C1 so as to be connected to the heater core 500 in series without installing a separate bypass valve controlling a flow rate of the coolant introduced into the oil warmer 1000 for a vehicle in the oil heat exchange system 2000 for a vehicle according to the present invention.

In more detail, in the case in which the vehicle initially starts or an external air temperature is low, the coolant is not sufficiently heated, and when a temperature of the coolant is approximately 70° C. or less, the temperature of the coolant is low, such that heat of the coolant is hardly transferred to the oil in the oil warmer 1000 for a vehicle, and most of the coolant may be used to heat the heater core 500.

In addition, when a time elapses after the engine 400 is operated, the coolant is sufficiently heated, such that the temperature of the coolant rises. Here, when the temperature of the coolant rises to 70° C. or more, heat transfer performance of the oil warmer 1000 for a vehicle is rapidly increased, such that heat of the coolant is transferred to the oil, thereby making it possible to heat the oil.

Therefore, in the case in which the interior of the vehicle needs to be heated at the time of initial starting of the vehicle, heating performance of the interior may be secured in the initial stage, and after the interior is heated, the oil may be heated by the oil warmer 1000 for a vehicle.

Then, in the case in which the temperature of the coolant arrives at approximately 90° C. due to continuous driving and the temperature of the oil is overheated to 100° C. or more, the oil may be accessorily cooled in the oil cooler 700 and oil warmer 1000 for a vehicle.

In addition, the flow of the oil passing through the oil warmer 1000 for a vehicle and the oil cooler 700 may be controlled by the oil controller 800. Here, the oil controller 800 may allow the oil to pass through only the oil warmer 1000 for a vehicle in the case in which the oil needs to be heated, may allow the oil to pass through the oil cooler 700 in the case in which the oil needs to be cooled, and may block the second circulation portion C2 so that the oil does not pass through both of the oil warmer 1000 for a vehicle and the oil cooler 700 in the case in which the oil does not need to be heated and the cooled.

The present invention is not limited to the abovementioned exemplary embodiments, but may be variously applied. In addition, the present invention may be variously modified by those skilled in the art to which the present invention pertains without departing from the gist of the present invention claimed in the claims.

[Detailed Description of Main Elements]

| | |
|---|---|
| 2000: oil heat exchange system for vehicle | |
| 1000: oil warmer for vehicle | |
| 100: heat transfer tube | 100a: fin |
| 101: plane portion | 102: first bent portion |
| 103: second bent portion | |
| 110: fine pipe | 120: operating fluid |
| 200: case | |
| 201: first case | 202: second case |
| 203: third case | 204: fourth case |
| 210: first inlet pipe | 220: first outlet pipe |
| 230: second inlet pipe | 240: second outlet pipe |
| 250: guide groove | 260: protruding portion |
| 300: partition member | |
| 301: first partition member | 302: second partition member |
| 303: third partition member | 304: fourth partition member |
| 305: fifth partition member | 306: second partition member |
| 310, 311, 312: through-hole | 313, 314: slot |
| 320: step portion | 321: upper step portion |
| 322: lower step portion | |
| 400: engine | 410: transmission |
| 500: heater core | |
| 600: radiator | |
| 700: oil cooler | |
| 800: oil controller | |
| A: first space portion | B: second space portion |
| C1: first circulation portion | C2: second circulation portion |

The invention claimed is:

1. An oil warmer for a vehicle comprising:
a heat transfer tube having a plurality of fine pipes formed in a width direction therein, formed to corrugate so that valleys and peaks are repeated in a length direction at a predetermined height, and formed to have heat exchange performance changed depending on a temperature by an operating fluid being filled in the fine pipes;
a case having the heat transfer tube accommodated therein and including a first inlet pipe through which a coolant is introduced, a first outlet pipe through the coolant is discharged, a second inlet pipe through which oil is introduced, and a second outlet pipe through which the oil is discharged; and
a partition member coupled to the heat transfer tube and the case to partition an internal space of the case into upper and lower sides of the case in a height direction, thereby allowing a first space portion A in which the coolant flows to be formed at the upper side and allowing a second space portion B to be formed at the lower side.

2. The oil warmer for a vehicle of claim 1, wherein the heat transfer tube is, when a temperature of the coolant passing through the first space portion A exceeds a predetermined temperature, the operating fluid filled in the fine pipes flows, such that heat exchange is generated between the coolant and the oil through the heat transfer tube.

3. The oil warmer for a vehicle of claim 1, wherein the heat transfer tube is formed of an extruding tube, and has a form in which plane portions positioned perpendicularly to the length direction and first bent portions and second bent portions formed by roundly bending end portions of the plane portions and each forming the valleys and the peaks are alternated in the length direction.

4. The oil warmer for a vehicle of claim 1, wherein the heat transfer tube is formed so that opened both end portions of the fine pipes are closed after the operating fluid is filled in the fine pipes.

5. The oil warmer for a vehicle of claim 1, wherein the case includes first and second cases and separated from forward and backward each other in the width direction and coupled to each other to form a closed internal space, and
guide grooves are formed in the first and second cases and, respectively, and a circumference of the partition member is inserted and coupled into the guide grooves.

6. The oil warmer for a vehicle of claim 1, wherein the case includes first and second cases and separated from each other in the height direction and coupled to each other to form a closed internal space, and
the partition member is disposed and coupled between the first and second cases.

7. The oil warmer for a vehicle of claim 3, wherein the partition member includes a first partition member in which a plurality of through-holes into which the first bent portions of the heat transfer tube are inserted are formed to be spaced apart from each other in the length direction and a second partition member in which a plurality of through-holes into which the second bent portions of the heat transfer tube are inserted are formed to be spaced apart from each other in the length direction, the first partition member is fitted into the heat transfer tube from a lower side in the height direction toward an upper side in the height direction, and the second partition member is fitted into the heat transfer tube from the upper side in the height direction toward the lower side in the height direction, such that the first partition member and the second partition member are closely adhered and coupled to each other.

8. The oil warmer for a vehicle of claim 7, wherein the first partition member or the second partition member is formed of a clad member having a clad layer formed on one surface thereof, such that surfaces of the first and second partition members and closely adhered to each other are coupled to each other by brazing.

9. The oil warmer for a vehicle of claim 3, wherein the partition member includes third and fourth partition members and fitted and coupled into the heat transfer tube at both sides in the width direction,
a plurality of slots and of which end portions are opened are formed in the third and fourth partition members and, respectively, so that the plane portions are inserted, and
end portions of the third and fourth partition members and in contact with each other are closely adhered and coupled to each other.

10. The oil warmer for a vehicle of claim 9, wherein an end portion of the third partition member fitted into the heat transfer tube is formed as a step portion stepped in the height direction, such that end portions of the third partition member and the fourth partition member meeting each other are coupled to each other so as to overlap each other in the width direction.

11. The oil warmer for a vehicle of claim 10, wherein portions of the step portion of the third partition member are formed as upper step portions stepped upwardly in the height direction, and the other portions thereof are formed as lower step portions stepped downwardly in the height direction, such that the end portion of the fourth partition member is inserted and coupled between the upper step portions and the lower step portions of the third partition member.

12. The oil warmer for a vehicle of claim 3, wherein the oil warmer for a vehicle includes fins a coupled between the plane portions of the heat transfer tube positioned in the first space portion A.

13. The oil warmer for a vehicle of claim 1, wherein in the heat transfer tube, both side surfaces, in the width direction, of regions forming the valleys while being positioned in the second space portion B in the heat transfer tube are closed, and
in the partition member, regions coupled to regions forming the peaks in the heat transfer tube are closed and regions coupled to the regions forming the valleys in the heat transfer tube are opened.

14. The oil warmer for a vehicle of claim 13, wherein the heat transfer tube is, when a temperature of the coolant passing through the first space portion A exceeds a predetermined temperature, the operating fluid filled in the fine pipes flows, such that heat exchange is generated between the coolant and the oil through the heat transfer tube.

15. The oil warmer for a vehicle of claim 13, wherein the heat transfer tube is formed of an extruding tube, and has a form in which plane portions positioned perpendicularly to the length direction and first bent portions and second bent portions formed by roundly bending end portions of the plane portions and each forming the valleys and the peaks are alternated in the length direction.

16. The oil warmer for a vehicle of claim 13, wherein the heat transfer tube is formed so that opened both end portions of the fine pipes are closed after the operating fluid is filled in the fine pipes.

17. The oil warmer for a vehicle of claim 13, wherein the case includes first and second cases and separated forward and backward from each other in the width direction and coupled to each other to form a closed internal space, and
guide grooves are formed in the first and second cases and, respectively, and a circumference of the partition member is inserted and coupled into the guide grooves.

18. The oil warmer for a vehicle of claim 13, wherein the case includes first and second cases and separated from each other in the height direction and coupled to each other to form a closed internal space, and
the partition member is disposed and coupled between the first and second cases.

19. The oil warmer for a vehicle of claim 15, wherein through-holes into which the first bent portions of the heat transfer tube are inserted are formed in the partition member so as to be spaced apart from each other in the length direction, such that the partition member is fitted and coupled into the heat transfer tube from a lower side in the height direction toward an upper side in the height direction.

20. The oil warmer for a vehicle of claim 15, wherein the partition member includes fifth and sixth partition members and fitted and coupled into the heat transfer tube at both sides in the width direction,
a plurality of slots and of which end portions are opened are formed in the fifth and sixth partition members and, respectively, so that both plane portions extended from the first bent portions are inserted, and
end portions of the fifth and sixth partition members and in contact with each other are closely adhered and coupled to each other.

21. The oil warmer for a vehicle of claim 20, wherein an end portion of the fifth partition member fitted into the heat transfer tube is formed as a step portion stepped in the height direction, such that end portions of the fifth partition member and the sixth partition member meeting each other are coupled to each other so as to overlap each other in the width direction.

22. The oil warmer for a vehicle of claim 21, wherein portions of the step portion of the fifth partition member are formed as upper step portions stepped upwardly in the height direction, and the other portions thereof are formed as lower step portions stepped downwardly in the height direction, such that the end portion of the sixth partition member is inserted and coupled between the upper step portions and the lower step portions of the fifth partition member.

23. The oil warmer for a vehicle of claim 15, wherein the oil warmer for a vehicle includes fins a positioned between the plane portions of the heat transfer tube positioned in the first space portion A.

24. The oil warmer for a vehicle of claim 16, wherein in the oil warmer for a vehicle, the coolant introduced into the first inlet pipe flows to an inner portion of the first space portion A and spaces formed in inner regions of first bent portions of the heat transfer tube.

25. An oil heat exchange system for a vehicle, comprising:
an engine corresponding to an internal combustion engine for a vehicle;
a heater core having a coolant heated by the engine and introduced thereinto to heat air for the purpose of heating of the vehicle;
a radiator cooling the coolant heated by the engine using external air;
a transmission;
the oil warmer for a vehicle of claim 1 connected to a rear end of the heater core in series on a first circulation portion C1 through which the coolant discharged from the engine passes through the heater core and is again circulated to the engine to have the coolant introduced into a first space portion A thereof, disposed on a second circulation portion C2 through which oil discharged from the transmission is circulated to have the oil introduced into a second space portion B thereof, and heat-exchanging the coolant and the oil with each other;
an oil cooler mounted in the radiator, disposed on the second circulation portion C2 so as to be connected to the oil warmer for a vehicle in parallel to have the oil flowing to an inner portion thereof, and heat-exchanging the coolant and the oil with each other; and
an oil controller installed in front of the oil warmer for a vehicle and the oil cooler on the second circulation portion C2 and controlling a flow of the oil passing through the oil warmer for a vehicle and the oil cooler.

* * * * *